US012789400B2

(12) United States Patent
Schoeman et al.

(10) Patent No.: US 12,789,400 B2
(45) Date of Patent: Nov. 10, 2026

(54) ELECTRIC SHAVER WITH ROTATABLE EXTERNAL CUTTING MEMBER HAVING ADJUSTABLE ROTATIONAL SPEED

(71) Applicant: KONINKLIJKE PHILIPS N.V., Eindhoven (NL)

(72) Inventors: Adriana Elizabeth Schoeman, Drachten (NL); Martijn Dirk Klein Horsman, Kenmore, WA (US); Martinus Bernardus Stapelbroek, Frieschepalen (NL); Robbert Freerk Johan Van Der Scheer, Groningen (NL); Salman Shafqat, Drachten (NL); Willem Auke Westerhof, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 85 days.

(21) Appl. No.: 18/878,137

(22) PCT Filed: Jun. 8, 2023

(86) PCT No.: PCT/EP2023/065320
§ 371 (c)(1),
(2) Date: Dec. 23, 2024

(87) PCT Pub. No.: WO2023/247194
PCT Pub. Date: Dec. 28, 2023

(65) Prior Publication Data

US 2025/0387935 A1 Dec. 25, 2025

(30) Foreign Application Priority Data

Jun. 23, 2022 (EP) .................................... 22180662

(51) Int. Cl.
*B26B 19/38* (2006.01)
*B26B 19/14* (2006.01)
*B26B 19/28* (2006.01)

(52) U.S. Cl.
CPC .......... *B26B 19/388* (2013.01); *B26B 19/143* (2013.01); *B26B 19/28* (2013.01)

(58) Field of Classification Search
CPC ...... B26B 19/388; B26B 19/143; B26B 19/28
See application file for complete search history.

(56) References Cited

U.S. PATENT DOCUMENTS 2,283,834 A 5/1942 Dam
2,418,722 A 4/1947 Herbert
(Continued)

FOREIGN PATENT DOCUMENTS

CN 114012791 A 2/2022
EP 4296017 A1 * 12/2023 ............. B26B 19/28
(Continued)

OTHER PUBLICATIONS

International Search Report Dated Aug. 14, 2023 for Internatinal Appln No. PCT/EP2023/066155 Filed Jun. 15, 2023.

*Primary Examiner* — Omar Flores Sanchez

(57) ABSTRACT

An electric shaver (1) comprises at least one hair-cutting unit (9*a*, 9*b*, 9*c*) having a central axis (11), an external cutting member (13) with hair-entry openings (61), and an internal cutting member (15). The internal and external cutting members are rotated about the central axis, respectively, at a first rotational speed (ω1) and at a second rotational speed (ω2) and such that the internal and external cutting members are rotated relative to each other. The electric shaver further comprises a detection system (87) for measuring at least one user-related parameter (URP) relating to skin or hairs of a user of the electric shaver or relating to manipulation of the electric shaver by the user relative to a body of the user. The (Continued)

electric shaver further comprises a processor (89) for controlling the second rotational speed (ω2) of the external cutting member in dependence on the at least one measured user-related parameter.

15 Claims, 13 Drawing Sheets

(56) References Cited

U.S. PATENT DOCUMENTS

| | | | | |
|---|---|---|---|---|
| 3,245,145 | A | 4/1966 | Buford | |
| 5,671,535 | A * | 9/1997 | Van Der Borst | B26B 19/28 30/43.6 |
| 5,687,481 | A * | 11/1997 | De Boer | B26B 19/388 30/43.6 |
| 5,983,501 | A | 11/1999 | Izumi | |
| 10,195,751 | B2 | 2/2019 | Shimizu | |
| 2010/0011587 | A1 | 1/2010 | Obermann | |
| 2014/0137714 | A1* | 5/2014 | Krenik | B26B 19/388 83/13 |
| 2015/0040934 | A1* | 2/2015 | Krenik | A45D 24/36 132/214 |
| 2018/0145618 | A1* | 5/2018 | Neyer | B26B 19/3873 |
| 2019/0126500 | A1 | 5/2019 | Wu | |
| 2019/0224865 | A1* | 7/2019 | Robinson | B26B 21/4081 |
| 2019/0306259 | A1* | 10/2019 | Burghardt | B26B 19/388 |
| 2020/0262092 | A1* | 8/2020 | Perez Lopez | B26B 19/388 |
| 2021/0114241 | A1* | 4/2021 | Baron | B26B 19/42 |
| 2023/0291337 | A1* | 9/2023 | Hermann | H02P 7/29 |

FOREIGN PATENT DOCUMENTS

| | | | | |
|---|---|---|---|---|
| EP | 4296018 | A1 * | 12/2023 | B26B 19/28 |
| JP | 2010227225 | A | 10/2010 | |
| WO | 2013104965 | A1 | 7/2013 | |
| WO | 2020212276 | A1 | 10/2020 | |

* cited by examiner

ELECTRIC SHAVER WITH ROTATABLE EXTERNAL CUTTING MEMBER HAVING ADJUSTABLE ROTATIONAL SPEED

CROSS-REFERENCE TO PRIOR APPLICATIONS

This application is a U.S. National Phase patent application under 35 U.S.C. § 371 of International Patent Application No. PCT/EP2023/065320, filed on Jun. 8, 2023, which claims the benefit of European Patent Application No. 22180662.3 filed on Jun. 23, 2022. These applications are hereby incorporated by reference herein.

FIELD OF THE INVENTION

The invention relates to an electric shaver comprising:

at least one hair-cutting unit having a central axis, an external cutting member having hair-entry openings provided in an annular shaving area arranged concentrically about the central axis, and an internal cutting member covered by the external cutting member and having an annular array of cutting elements arranged concentrically about the central axis; and a drive system configured to rotate the internal cutting member of each hair-cutting unit about the central axis of the hair-cutting unit at a first rotational speed, and to rotate the external cutting member of each hair-cutting unit about the central axis of the hair-cutting unit at a second rotational speed and such that the internal cutting member and the external cutting member of each hair-cutting unit are rotated relative to each other about the central axis of the hair-cutting unit.

BACKGROUND OF THE INVENTION

Electric shavers comprising at least one hair-cutting unit having a central axis, an external cutting member having hair-entry openings provided in an annular shaving area arranged concentrically about the central axis, and an internal cutting member covered by the external cutting member and having an annular array of cutting elements arranged concentrically about the central axis, and further comprising a drive system configured to rotate the internal cutting member of each hair-cutting unit relative to the external cutting member about the central axis of the hair-cutting unit, are well known. Such electric shavers usually comprise a shaving unit with two or more of such hair-cutting units supported by a supporting structure of the shaving unit. The electric shavers usually comprise a main housing accommodating an electric motor. The shaving unit may be coupled to the main housing in a permanent way or in a releasable way. When the shaving unit is coupled to the main housing, the motor is coupled to the internal cutting members of the hair-cutting units via a transmission system allowing the motor to rotate the internal cutting members relative to the external cutting members. During rotation of the internal cutting members, hairs penetrate into the external cutting members via the hair-entry openings of the external cutting members and are cut by interaction of cutting edges provided on the cutting elements of the rotating internal cutting members and counter cutting edges provided at the hair-entry openings of the external cutting members.

An important property of the hair-cutting units of such electric shavers is the hair-catching efficiency, i.e., the degree at which hairs are able to penetrate into the hair-entry openings of the external cutting members during movement of the electric shaver over a user's skin with the annular shaving areas of the external cutting members in contact with the skin. A high hair-catching efficiency is desirable, because it will reduce the time of the shaving process required to achieve a desired shaving result. e.g., in terms of an average remaining hair length after the shaving process. The higher the hair-catching efficiency. the better the hairs will penetrate into the hair-entry openings of the external cutting members and be cut by the hair-cutting units, e.g., during a single movement stroke of the electric shaver over a particular area of the skin, and the smaller will be the resulting average remaining hair length after the shaving process. To improve the hair-catching efficiency, it has been proposed to also drive the external cutting members of the hair-cutting units into rotation about the central axes of the hair-cutting units. For this purpose, known electric shavers have a drive system configured to rotate the internal cutting member of each hair-cutting unit about the central axis of the hair-cutting unit at a first rotational speed (in revolutions per unit of time), and to rotate the external cutting member of each hair-cutting unit about the central axis of the hair-cutting unit at a second rotational speed (in revolutions per unit of time) and such that the internal cutting member and the external cutting member of each hair-cutting unit are rotated relative to each other about the central axis of the hair-cutting unit.

U.S. Pat. No. 2,283,834 discloses an electric shaver comprising a hair-cutting unit having an external cutting member provided with slit-shaped hair-entry openings that extend substantially radially with respect to the central axis of the hair-cutting unit. The hair-cutting unit has an internal cutting member which is rotated at a relatively high speed, e.g., between 6,000 and 15,000 rpm (revolutions per minute). The external cutting member is rotated in a direction opposite to the rotational direction of the internal cutting member at a significantly lower speed in a range between 40 and 120 rpm, preferably about 80 rpm. According to this patent, the relatively slow and continuous rotation of the external cutting member causes oblique hairs, which grow in various directions, to be caught better and more regularly in the slit-shaped hair-entry openings than would be possible by means of a circular manual movement of a shaver having a stationary external cutting member.

U.S. Pat. No. 10,195,751 B2 discloses an electric shaver comprising a shaving unit having three hair-cutting units. The hair-cutting units each have an internal cutting member and an external cutting member provided with slit-shaped hair-entry openings that extend radially with respect to the central axis of the hair-cutting unit, round hair-entry openings, or hair-entry openings having a combined round and slit shape. The internal cutting member and the external cutting member of each hair-cutting unit are rotatably driven in the same direction or in mutually opposite directions about a central axis of the hair-cutting unit. According to this patent, the rotation of the external cutting members results in an advantageous effect of a more favorable sensation to the skin by improving a user's action for raising and catching the hairs. In an example, the shaver has a gear transmission mechanism configured to convert a motor rotation speed of 8,000 rpm into a rotation speed of the external cutting member of approximately 10 rpm.

A disadvantage of these known electric shavers is that the rotational speed of the external cutting members may not be optimal under all circumstances of use or operation of the shaver by the user and may in general not be optimal for all users of the shaver. In particular, the hair-catching efficiency of the shaver, although improved by the rotation of the external cutting members, may vary depending on the specific way of use or operation of the shaver by the user or depending on specific properties of the user's hairs and, thereby, may not be optimal under all use circumstances or for all users. In addition, the rotation of the external cutting members may be experienced as unpleasant by some users under specific circumstances, e.g., depending on specific properties of the user's skin.

JP2010227225A discloses an electric shaver having a main body or gripping portion and a shaving unit or head portion arranged on an upper portion of the gripping portion. The head portion comprises three hair-cutting units or blade blocks, wherein each blade block has an external cutting member or outer blade and an internal cutting member or inner blade. The outer blades of the blade blocks extend parallel to each other in a longitudinal direction of the head portion. An electrically driven inner blade driving device is arranged in the head portion for reciprocating oscillation of the inner blade of each blade block relative to the outer blade of the blade block parallel to the longitudinal direction. Furthermore, an electrically driven head driving device is arranged in the head portion, which is configured to reciprocate the head portion as a whole in the longitudinal direction and/or in a lateral direction of the head portion extending perpendicularly to the longitudinal direction, and/or to swing and reciprocate the head portion as a whole about a central rotary axis of the head portion which extends perpendicularly to the longitudinal direction and the lateral direction. According to this patent application, as a result of at least one of the longitudinal vibration, lateral vibration and swinging vibration of the head portion described here before, the introduction of beard hairs into the outer blades of the blade blocks is improved, so that the shaving performance of the electric shaver is improved. Furthermore, detection means are provided for detecting an operation state of the shaver, and control means are provided for controlling the head driving device based on a detection signal from the detection means. As a result, the introduction rate of beard hairs into the outer blades of the blade blocks and the shaving performance are stable even when the operating states of the shaver are different. Examples of the measured operating states are the movement speed or movement acceleration of the head portion and the contact pressure that the outer blades receive from the user's skin. Based on the detection signal the control means may control the frequency, amplitude, speed or acceleration of the longitudinal vibration and/or the lateral vibration and/or the swinging vibration of the head portion as a whole.

SUMMARY OF THE INVENTION

It is an object of the present invention to provide an electric shaver of a kind as described here before in the section "field of the invention" which does not have the disadvantages as described here before in relation to the electric shavers known from U.S. Pat. Nos. 2,283,834 and 10,195,751.

To achieve the above-mentioned object, the present invention provides an electric shaver comprising:

at least one hair-cutting unit having a central axis, an external cutting member having hair-entry openings provided in an annular shaving area arranged concentrically about the central axis, and an internal cutting member covered by the external cutting member and having an annular array of cutting elements arranged concentrically about the central axis; and a drive system configured to rotate the internal cutting member of each hair-cutting unit about the central axis of the hair-cutting unit at a first rotational speed, and to rotate the external cutting member of each hair-cutting unit about the central axis of the hair-cutting unit at a second rotational speed and such that the internal cutting member and the external cutting member of each hair-cutting unit are rotated relative to each other about the central axis of the hair-cutting unit; wherein the electric shaver further comprises:

a detection system configured and arranged to measure at least one user-related parameter relating to skin or hairs of a user of the electric shaver or relating to manipulation of the electric shaver by the user relative to a body of the user; and a processor configured and arranged to control the drive system such that the second rotational speed, at which the drive system rotates the external cutting member about the central axis of the hair-cutting unit, depends on the at least one measured user-related parameter.

Thus, in an electric shaver according to the present invention the internal cutting member of each hair-cutting unit is rotated about the central axis of the hair-cutting unit by the drive system at a first rotational speed (in revolutions per unit of time), and the external cutting member of each hair-cutting unit is rotated about the central axis of the hair-cutting unit by the drive system at a second rotational speed (in revolutions per unit of time). The internal cutting member and the external cutting member may have the same rotational direction or mutually opposite rotational directions about the central axis. By the first and second rotational speeds and the rotational directions of the internal cutting member and the external cutting member, a relative rotation between the internal cutting member and the external cutting member should be effectuated to an extent sufficient to achieve an effective hair-cutting process, as is known in the art.

In particular, according to the present invention, the second rotational speed, at which the drive system rotates the external cutting member, depends on at least one user-related parameter which is measured by means of a detection system. In particular, said at least one user-related parameter relates to skin or hairs of the user of the electric shaver or relates to manipulation of the electric shaver by the user relative to the user's body. Thus, the processor may automatically adapt the second rotational speed of the external cutting member to, for example, particular user specific ways in which the user manipulates the electric shaver relative to the user's body that influence the hair-catching efficiency, user specific hair properties that influence the hair-catching efficiency, or user specific skin properties that influence the way the user experiences the rotation of the external cutting member. In particular, the processor may automatically adapt the second rotational speed of the external cutting member such that the hair-catching efficiency will remain on an optimum level or at least a desired level independent from or less dependent on the specific way in which the user manipulates the electric shaver or the user specific hair properties, or such that the rotation of the external cutting member is experienced by the user as acceptable independent from or less dependent on the user specific skin properties. Examples of such user-related parameters and of the manner of controlling the second rotational speed of the external cutting member depending on such user-related parameters will be described in the following with reference to embodiments of the present invention.

In an embodiment of the electric shaver according to the invention, the at least one user-related parameter comprises at least one of; a location of the electric shaver on a body of the user; a cumulative amount of shaving time of the electric shaver for a plurality of different areas of the user's body during a shaving session; a motion speed at which the user moves the electric shaver over the user's body; a pressure or force at which the user presses the electric shaver against the body; a parameter relating to a skin property of the user; and a parameter relating to a hair property of the user. The detection system may be configured and arranged to measure only one of said user-related parameters or to measure two or more of said user-related parameters. Accordingly, the processor may be configured and arranged to control the second rotational speed of the external cutting member depending on only one of said user-related parameters or depending on two or more of said user-related parameters.

In an embodiment of the electric shaver according to the invention wherein the at least one user-related parameter comprises the location of the electric shaver on the body of the user, i.e., as a first example of a user-related parameter relating to manipulation of the electric shaver by the user relative to the user's body, the detection system comprises a detector configured and arranged to measure the location of the electric shaver on the body of the user. In such an embodiment, the processor may for example be configured to reduce the second rotational speed of the external cutting member when the detector detects that the electric shaver is moved from a location on the user's body where the skin is known for having a relatively low sensitivity, such as the check area of the face, to a location on the user's body where the skin is known for having a relatively high sensitivity, such as the neck arca, and vice versa. In this way the user may experience the rotation of the external cutting member as acceptable independent from or less dependent on the location where the electric shaver is actually shaving.

In an embodiment of the electric shaver according to the invention wherein the at least one user-related parameter comprises the cumulative amount of shaving time of the electric shaver for a plurality of different areas of the user's body during a shaving session, i.e., as a second example of a user-related parameter relating to manipulation of the electric shaver by the user relative to the user's body, the detection system comprises a detector configured and arranged to measure the location of the electric shaver on the body of the user, and the processor is configured to measure the cumulative amount of shaving time of the electric shaver for each of the plurality of different areas of the user's body based on the location of the electric shaver measured by the detector and timing output provided by a timer. When a user is shaving for a longer time on the same skin area, skin irritation can increase, even on the check arca. Said increase of skin irritation can be limited, for example, by automatically decreasing the second rotational speed of the external cutting member when the cumulative amount of shaving time in a particular skin area exceeds a predefined threshold. For this purpose, the processor may be configured to decrease the second rotational speed of the external cutting member when, for a particular one of the plurality of different areas of the user's body, the measured cumulative amount of shaving time exceeds a predefined threshold and the location of the electric shaver measured by the detector is within said particular one of the plurality of different areas of the user's body.

In an embodiment of the electric shaver according to the invention wherein the at least one user-related parameter comprises the motion speed at which the user moves the electric shaver over the user's body, i.e., as a third example of a user-related parameter relating to manipulation of the electric shaver by the user relative to the user's body, the detection system comprises a detector configured and arranged to measure the motion speed at which the user moves the electric shaver over the user's body. A known problem with electric shavers is that the hair-catching efficiency of the hair-cutting unit decreases when the user increases the motion speed of the electric shaver over the body. The hair-catching efficiency may be increased by increasing the second rotational speed of the external cutting member, at least within a predefined range of the second rotational speed which depends on the detailed design of the external cutting member, in particular the design of the hair-entry slots thereof. Therefore, in this embodiment the processor may be configured to increase the second rotational speed of the external cutting member when the measured motion speed increases.

In an embodiment of the electric shaver wherein the at least one user-related parameter comprises the pressure or force at which the user presses the electric shaver against the body, i.e., as a fourth example of a user-related parameter relating to manipulation of the electric shaver by the user relative to the user's body, the detection system comprises a detector configured and arranged to measure the pressure or force at which the user presses the electric shaver against the body. When said pressure or force increases, the degree of skin doming into the hair-entry openings of the external cutting member increases, resulting in a potential increase of skin irritation. Because the degree of skin doming into the hair-entry openings may be reduced by increasing the second rotational speed of the external cutting member, an increase of skin irritation caused by an increase of said pressure can be prevented or limited when, in this embodiment, the processor is configured to increase the second rotational speed of the external cutting member when the measured pressure or force increases.

In an embodiment of the electric shaver according to the invention wherein the at least one user-related parameter comprises a parameter relating to a skin property of the user, the detection system comprises a detector configured and arranged to measure said parameter relating to said skin property of the user. A well-known skin property influenced by the shaving process is for example skin redness, which may be an indication of the degree of skin irritation caused by the shaving process. In this example the processor may be configured to reduce the second rotational speed of the external cutting member when the detector measures an increase of the skin redness. The second rotational speed of the external cutting member may be controlled by the processor depending on another skin property as well, in particular when such a skin property influences the hair-catching efficiency.

In an embodiment of the electric shaver according to the invention wherein the at least one user-related parameter comprises a parameter relating to a hair property of the user, the detection system comprises a detector configured and arranged to measure said parameter relating to said hair property of the user. Preferably, said hair property is a hair property that may influence the hair-catching efficiency of the hair-cutting unit, such as a hair length, a hair thickness or a hair density on the skin. When for example the hair length is measured by the detector, the processor may be configured to increase the second rotational speed of the external cutting member when the detector measures an increase of the hair length. Thereby, the hair-catching efficiency for longer hairs may be increased.

In an embodiment of the electric shaver according to the invention, the drive system comprises a single motor configured and arranged to rotate both the internal cutting member of each hair-cutting unit and the external cutting member of each hair-cutting unit about the central axis of the hair-cutting unit via a transmission system, and the processor is configured and arranged to control the single motor such that the second rotational speed of the external cutting member depends on the measured user-related parameter. The use of a single motor in this embodiment results in a relatively simple structure of the electric shaver. In this embodiment, an adjustment of the second rotational speed of the external cutting member by the processor will in general also result in a proportional adjustment of the first rotational speed of the internal cutting member. Such an adjustment of the first rotational speed of the internal cutting member may however be acceptable in many practical applications as long as the first rotational speed remains within a range required for effective hair cutting.

In a preferred embodiment of an electric shaver according to the invention, the drive system comprises a first motor configured and arranged to rotate the internal cutting member of each hair-cutting unit about the central axis of the hair-cutting unit, and a second motor configured and arranged to rotate the external cutting member of each hair-cutting unit about the central axis of the hair-cutting unit, and the processor is configured and arranged to control the second motor such that the second rotational speed of the external cutting member depends on the measured user-related parameter. In this embodiment the second rotational speed of the external cutting member can be adjusted independently from the first rotational speed of the internal cutting member. For example, the first motor may maintain the first rotational speed of the internal cutting member at a constant value which is optimal for hair cutting, while the second motor may adjust the second rotational speed of the external cutting member to maintain the hair-catching efficiency of the hair-cutting unit at an optimum level when the measured user-related parameter changes. The independent control of the rotation of the external cutting member in this embodiment further allows, for example, the provision of a user input member by means of which the user can switch on or off the rotation of the external cutting member or select between a number of predefined speed ranges for the external cutting member based on user preference.

In a further embodiment of an electric shaver according to the invention, the drive system is configured to rotate the internal cutting member of each hair-cutting unit in a first rotational direction about the central axis of the hair-cutting unit and to rotate the external cutting member of each hair-cutting unit in a second rotational direction opposite to the first rotational direction about the central axis of the hair-cutting unit, and the second rotational speed of the external cutting member is lower than the first rotational speed of the internal cutting member. By rotating the internal cutting member and the external cutting member of each hair-cutting unit in mutually opposite directions, the rotational speed of the internal cutting member relative to the external cutting member, which mainly determines the hair-cutting efficiency of the internal cutting member, can be reduced as compared with an embodiment wherein the internal cutting member and the external cutting member rotate in the same direction. Furthermore, an optimum value or range of the second rotational speed of the external cutting member (in revolutions per unit of time), which mainly determines the hair-catching efficiency of the external cutting member, was found to be generally lower than an optimum value or range of the first rotational speed of the internal cutting member (in revolutions per unit of time) required for optimum hair cutting.

In an embodiment of the electric shaver according to the invention wherein the drive system is configured to rotate the internal cutting member and the external cutting member of each hair-cutting unit in mutually opposite directions as described here before, the hair-entry openings of the external cutting member of each hair-cutting unit may comprise a V-shaped opening portion pointing in the first rotational direction of the internal cutting member, and the second rotational speed of the external cutting member of each hair-cutting unit may be such that a tangential speed of the external cutting member relative to the central axis, measured in a radial position of a central base point of the V-shaped opening portions relative to the central axis, is in a range between 7.5 and 50 cm/s. In this embodiment, with respect to a V-shaped opening portion the term "central base point" refers to a point where the two leg portions of the V-shaped opening portion mutually connect.

Experiments performed by the inventors of the present invention confirmed that, for a hair-cutting unit having an external cutting member with straight slot-shaped hair-entry openings extending substantially in radial directions relative to the central axis of the hair-cutting unit, an increase of the hair-catching efficiency and, as a result, a reduction of the average remaining hair length after the shaving process are achieved by rotating the external cutting member in a direction opposite to the rotational direction of the internal cutting member. The experiments further demonstrated that, for a hair-cutting unit having an external cutting member having hair-entry openings with V-shaped opening portions pointing in the first rotational direction of the internal cutting member, a very significant increase of the hair-catching efficiency and, as a result, a very significant and user perceivable reduction of the average remaining hair length after the shaving process are achieved by rotating the external cutting member in a direction opposite to the rotational direction of the internal cutting member with a second rotational speed such that said tangential speed of the external cutting member relative to the central axis is in said range between 7.5 and 50 cm/s. In particular and surprisingly, a relative increase of the hair-catching efficiency and a relative reduction of the average remaining hair length as a result of the rotation of the external cutting member, i.e., relative to the hair-catching efficiency and the average remaining hair length achieved with a stationary external cutting member, were found to be significantly higher for an electric shaver according to the present embodiment of the invention than for an electric shaver with an external cutting member with straight radially extending hair-entry openings. When in this embodiment the second rotational speed of the external cutting member of each hair-cutting unit is such that said tangential speed of the external cutting member relative to the central axis is in a more preferred range between 11.25 and 30.0 cm/s, the significant increase of the hair-catching efficiency and, as a result, the significant and user perceivable reduction of the average remaining hair length after the shaving process as described here before are achieved with a minimum degree of additional skin friction caused by the rotation of the external cutting member.

A particularly remarkable improvement of the hair-catching efficiency is achieved in an embodiment of the electric shaver according to the invention, wherein the hair-entry openings extend over a first radial distance in a radial direction relative to the central axis of the hair-cutting unit, and the V-shaped opening portions of the hair-entry openings extend over a second radial distance in the radial direction, said second radial distance being at least 50% of said first radial distance.

In a further embodiment of the electric shaver according to the invention, the hair-entry openings of the external cutting member of each hair-cutting unit further comprise a radially inner straight opening portion, connected to the V-shaped opening portion at a first end of the V-shaped opening portion facing the central axis of the hair-cutting unit, and a radially outer straight opening portion, connected to the V-shaped opening portion at a second end of the V-shaped opening portion facing away from the central axis of the hair-cutting unit, said radially inner and outer straight opening portions each having a main direction of extension in a radial direction relative to the central axis of the hair-cutting unit. In this embodiment, the radially inner straight opening portions and the radially outer straight opening portions of the hair-entry openings provide a relatively high hair-catching efficiency for hairs that approach the hair-entry openings of the external cutting member via, respectively, an inner circumferential area of the annular shaving area and an outer circumferential area of the annular shaving area. The V-shaped opening portions of the hair-entry openings provide a relatively high hair-catching efficiency for hairs that approach the hair-entry openings via a central area of the annular shaving arca.

In a preferred embodiment of the electric shaver according to the invention, a V-angle of the V-shaped opening portions of the hair-entry openings is in a range from 60° to 135°. In this embodiment, with respect to a V-shaped opening portion said V-angle is defined as an angle enclosed by the two leg portions of the V-shaped opening portions. A V-angle in the range from 60° to 135° provides a stretching effect on the skin in two mutually diverging directions, which results in a reduction of skin doming into the hair-entry openings and, thereby, in a reduction of skin irritation caused by the shaving process.

The above-described and other aspects of the invention will be apparent from and elucidated with reference to the following detailed description of embodiments of an electric shaver in accordance with the invention.

BRIEF DESCRIPTION OF THE DRAWINGS

The invention will be explained in greater detail with reference to the figures, in which equal or similar features are indicated by the same reference signs, and in which.

DETAILED DESCRIPTION OF THE EMBODIMENTS

Figure 1:
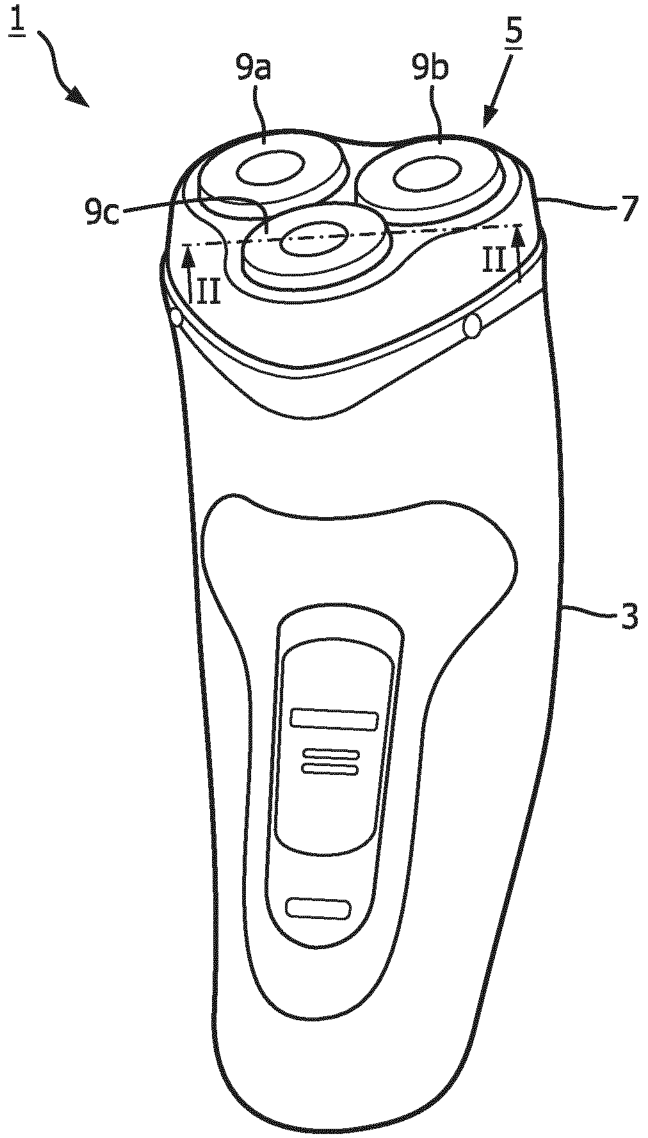
FIG. 1 schematically shows an electric shaver according to the invention.

FIG. 1 schematically shows an embodiment of an electric shaver 1 according to the invention. The electric shaver 1 comprises a main housing 3 designed to be held by a user's hand during operation. The shaving device 1 further comprises a shaving unit 5 which is coupled to the main housing 3. The shaving unit 5 comprises a supporting structure 7 and three hair-cutting units 9*a*, 9*b*, 9*c* supported by the supporting structure 7. The supporting structure 7 may comprise a coupling structure, not shown in FIG. 1 and of a kind well known to the skilled person, by means of which the shaving unit 5 is releasably coupled to the main housing 3. Alternatively, the shaving unit 5 may be permanently connected to the main housing 3. It is noted that a shaving unit of an electric shaver according to the invention may comprise a different number of hair-cutting units, for example one, two or more than three hair-cutting units. It is further noted that FIG. 1 merely shows the general layout of the electric shaver in a schematic manner and does not intend to limit the scope of the invention to the specific detailed design of the electric shaver as shown. For example, the invention also covers embodiments of an electric shaver wherein the shaving unit is coupled to the main housing via a relatively narrow centrally arranged coupling structure, with an open space being present between the shaving unit and the main housing around said coupling structure, as is well known in the art.

Figure 2:
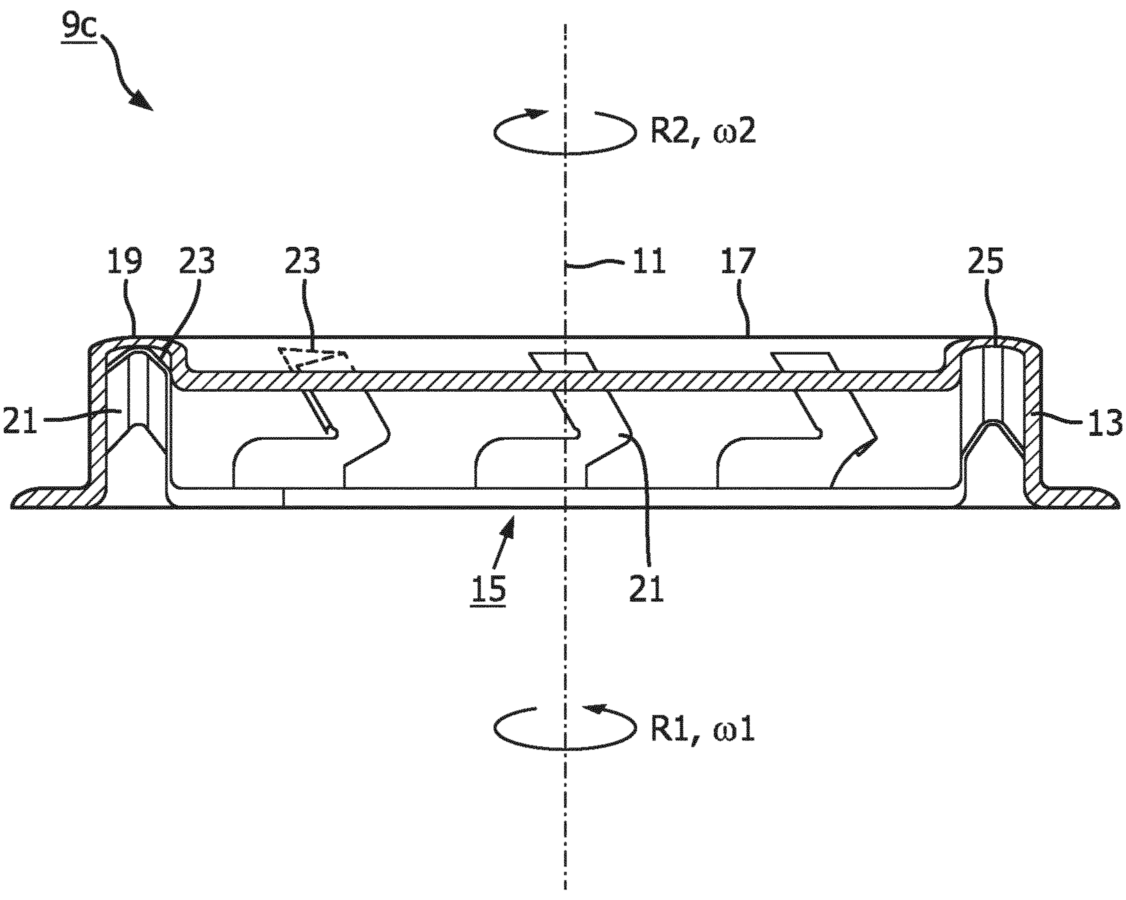
FIG. 2 is a schematic cross-sectional view of a hair-cutting unit of the electric shaver along the line II-II in FIG. 1.

FIG. 2 is a schematic cross-sectional view of the hair-cutting unit 9*c* along the line II-II in FIG. 1. The hair-cutting units 9*a* and 9*b* are similar to the hair-cutting unit 9*c*. The hair-cutting unit 9*c* comprises a central axis 11, an external cutting member 13 and an internal cutting member 15. The external cutting member 13 has an annular shaving area 17 arranged concentrically about the central axis 11. The annular shaving area 17 is arranged to be in contact with the skin of a user of the electric shaver 1 and comprises hair-entry openings (not visible in FIG. 2) that will be described in detail here after. The hair-entry openings are mutually separated by bridge portions 19 provided in the annular shaving area 17. The internal cutting member 15 is covered by the external cutting member 13 and has an annular array of cutting elements 21 arranged concentrically about the central axis 11. The electric shaver 1 comprises a drive system, to be described in detail here after, configured to rotate the internal cutting member 15 and the external cutting member 13 relative to each other about the central axis 11 during operation of the electric shaver 1. As a result of the mutual rotations of the internal cutting member 15 and the external cutting member 13. hairs on the user's skin that penetrate into the hair-entry openings present in the annular shaving arca 17 are cut by interaction of cutting edges 23 present on the cutting elements 21 of the internal cutting member 15 and counter cutting edges 25 present on the bridge portions 19 of the external cutting member 13. It is noted that an electric shaver according to the invention may have two or more annular shaving areas arranged concentrically about the central axis, as is known in the art.

Figure 3:
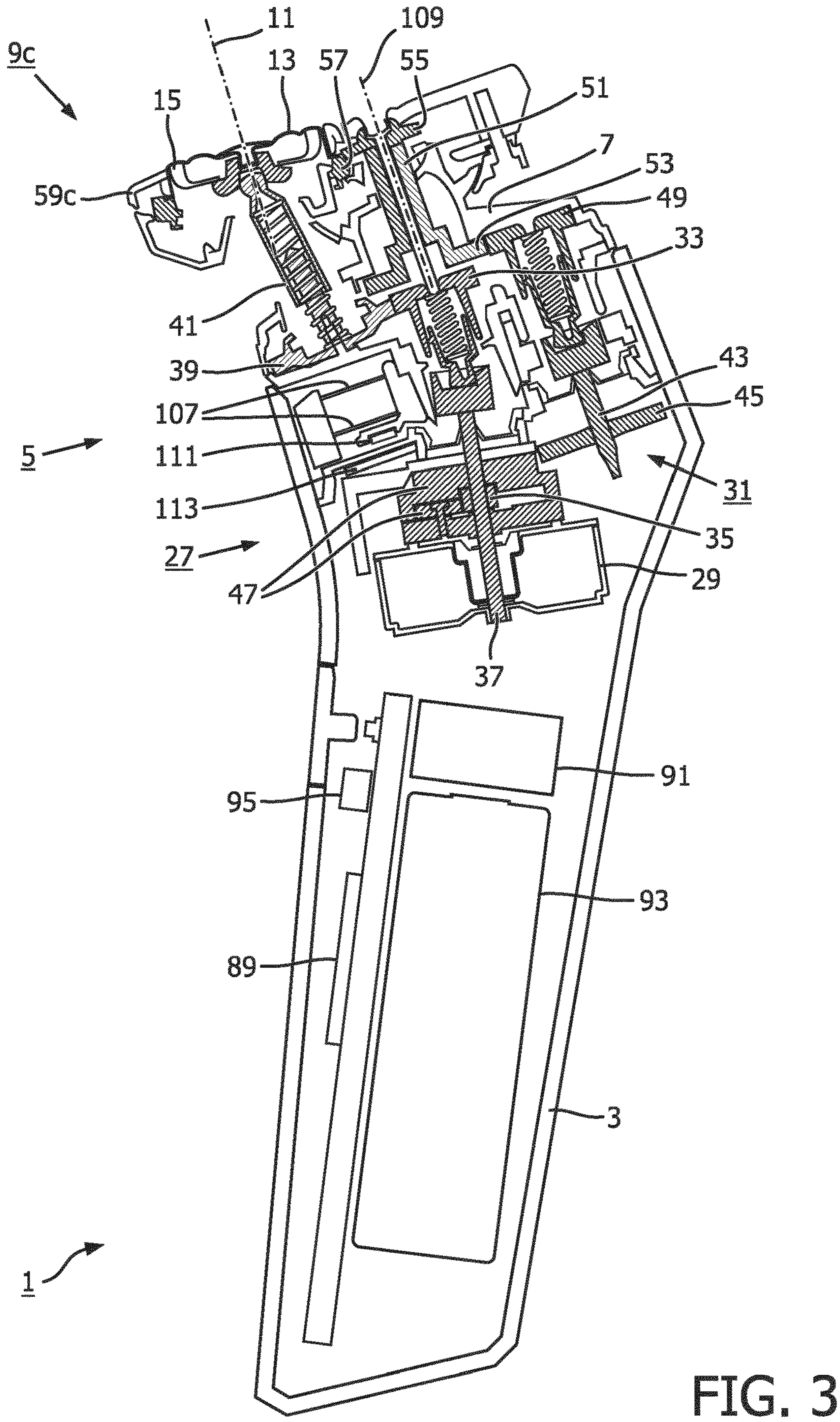
FIG. 3 schematically shows a drive system of the electric shaver of FIG. 1.

The drive system of the electric shaver 1 mentioned here before is schematically shown in FIG. 3 and is referred to by reference number 27. In the embodiment shown in FIG. 3, the drive system 27 comprises a single motor 29 which is arranged in the main housing 3. Furthermore, in this embodiment the drive system 27 is configured to rotate the internal cutting member 15 of each hair-cutting unit 9*a*, 9*b*, 9*c* about the central axis 11 of the hair-cutting unit 9*a*, 9*b*, 9*c* in a first rotational direction R1 (shown in FIG. 2) and at a first rotational speed ω1, and to rotate the external cutting member 13 of each hair-cutting unit 9*a*, 9*b*, 9*c* about the central axis 11 of the hair-cutting unit 9*a*, 9*b*, 9*c* in a second rotational direction R2 (shown in FIG. 2) opposite to the first rotational direction R1 and at a second rotational speed ω2 which is lower than the first rotational speed ω1. For this purpose, the drive system 27 comprises a transmission system 31 via which the motor 29 is able to rotate both the internal cutting member 15 and the external cutting member 13 of each hair-cutting unit 9*a*, 9*b*, 9*c*, wherein the transmission system 31 is partially arranged in the main housing 3 and partially arranged in the shaving unit 5. It is noted that, for simplicity reasons, FIG. 3 only shows one of the hair-cutting units 9*c* in detail. The driving of the other hair-cutting units 9*a*, 9*b* by the drive system 27 will be explained in the following. It is further noted that, for simplicity reasons, FIG. 3 docs only partially show the supporting structure 7 of the shaving unit 5.

As shown in FIG. 3, the transmission system 31 comprises a first primary gear wheel 33 and a second primary gear wheel 35 which are each mounted to a motor shaft 37 of the motor 29. The transmission system 31 further comprises three secondary gear wheels 39 which are each mounted to a respective one of three drive spindles 41, which are each coupled to a respective one of the three internal cutting members 15 of the hair-cutting units 9*a*, 9*b*, 9*c* and are each rotatably journaled relative to the supporting structure 7 of the shaving unit 5. The three secondary gear wheels 39 each engage the first primary gear wheel 33. It is noted that FIG. 3 only shows one of the secondary gear wheels 39 and one of the drive spindles 41 coupled to the internal cutting member 15 of the hair-cutting unit 9*c*, and that the secondary gear wheels and the drive spindles associated with the internal cutting members 15 of the hair-cutting units 9*a* and 9*b* are arranged in a corresponding manner.

Figure 4A:
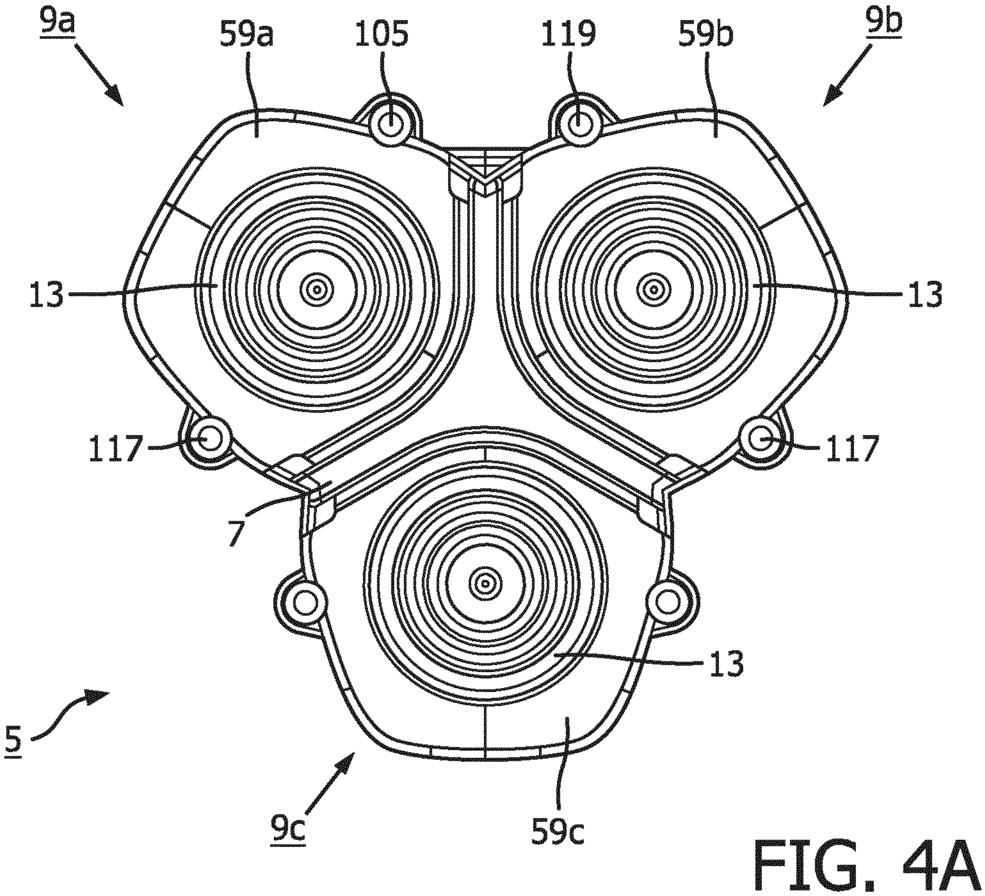
FIG. 4*a* is a top view of a shaving unit of the electric shaver of FIG. 1.
Figure 4B:
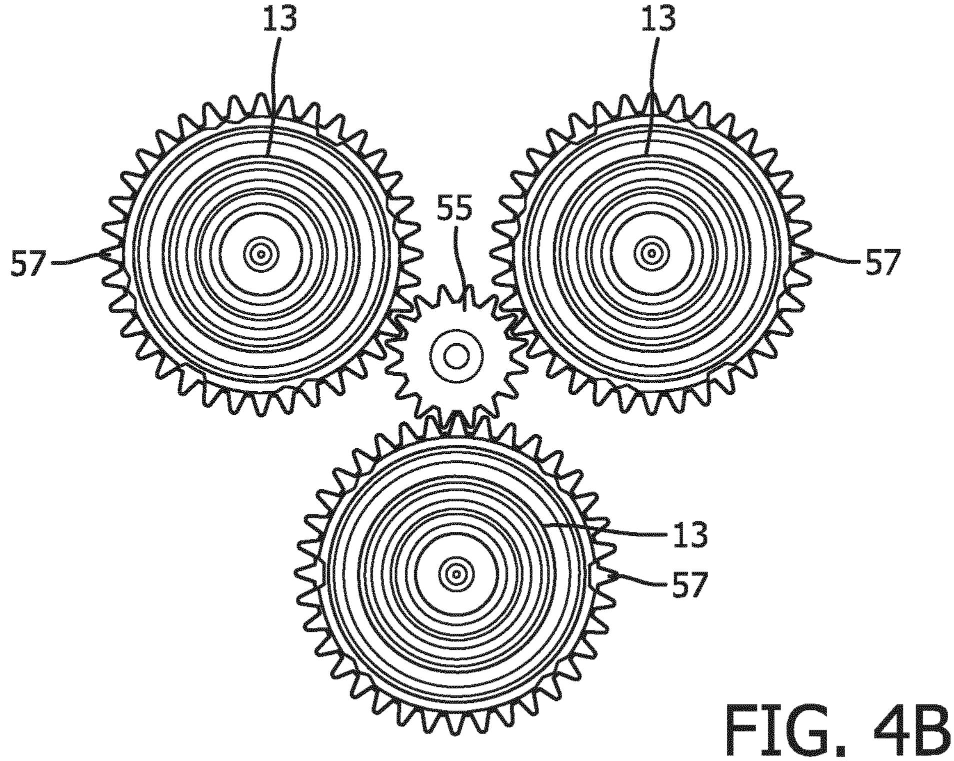
FIG. 4*b* shows a portion of the drive system of FIG. 3.

The transmission system 31 further comprises a secondary shaft 43 which is arranged parallel to the motor shaft 37. An upper portion of the secondary shaft 43 is arranged between two of the secondary gear wheels 39, but said arrangement is not visible in FIG. 3. The secondary shaft 43 carries a third primary gear wheel 45, which engages the second primary gear wheel 35 via a plurality of intermediate gear wheels 47, and a fourth primary gear wheel 49. The transmission system 31 further comprises a third shaft 51 which is arranged in line with the motor shaft 37 and which is rotatably journaled relative to the supporting structure 7 of the shaving unit 5. The third shaft 51 carries a fifth primary gear wheel 53, which engages the fourth primary gear wheel 49, and a sixth primary gear wheel 55. The external cutting members 13 of the hair-cutting units 9*a*, 9*b*, 9*c* each comprise a secondary gear wheel 57 which engages the sixth primary gear wheel 55 which is arranged centrally between the secondary gear wheels 57 of the external cutting members 13. It is noted that FIG. 3 only shows the secondary gear wheel 57 of the external cutting member 13 of the hair-cutting unit 9*c*, and that the secondary gear wheels 57 of the external cutting members 13 of the hair-cutting units 9*a* and 9*b* arc arranged in a corresponding manner. For clarity reasons, the arrangement of the secondary gear wheels 57 of the external cutting members 13 of all three hair-cutting units 9*a*, 9*b*, 9*c* is shown in FIG. 4*b*, FIG. 4*a* shows that the external cutting members 13 are each surrounded by a skin-supporting member 59*a*, 59*b*, 59*c* of the respective hair-cutting unit 9*a*, 9*b*, 9*c*. The skin-supporting members 59*a*, 59*b*, 59*c* each provide a rotational bearing for the respective external cutting member 13 and also cover the secondary gear wheel 57 of the respective external cutting member 13.

From prior art electric shavers it is known that the hair-catching efficiency of the hair-cutting units 9*a*, 9*b*, 9*c* is improved by the rotation of the external cutting member 13 of each hair-cutting unit 9*a*, 9*b*, 9*c* about the central axis 11 of the hair-cutting unit 9*a*, 9*b*, 9*c*. The hair-catching efficiency is the degree at which hairs are able to penetrate into the hair-entry openings of the external cutting members 13 during movement of the electric shaver 1 over the user's skin with the annular shaving areas 17 of the external cutting members 13 in contact with the skin. The higher the hair-catching efficiency, the better the hairs will penetrate into the hair-entry openings of the external cutting members 13 and be cut by the hair-cutting units 9*a*, 9*b*, 9*c*, e.g., during a single movement stroke of the electric shaver 1 over a particular area of the skin, and the smaller will be the resulting average remaining hair length after the single movement stroke. To improve the hair-catching efficiency, the rotational direction R2 of the external cutting member 13 of each hair-cutting unit 9*a*, 9*b*, 9*c* may be opposite to the rotational direction R1 of the internal cutting member 15, as in the embodiment shown in the figures, or the internal cutting member 15 and the external cutting member 13 of each hair-cutting unit 9*a*, 9*b*, 9*c* may have the same rotational direction. In the latter case, the rotational speeds ω1 and ω2 of the internal cutting member 15 and the external cutting member 13 should sufficiently differ from each other such that a relative rotation between the internal cutting member 15 and the external cutting member 13 is effectuated to an extent sufficient to achieve an effective hair-cutting process, as is known to the person skilled in the art. Thus, the present invention is not limited to embodiments wherein the internal cutting members 15 and the external cutting members 13 of the hair-cutting units 9*a*, 9*b*, 9*c* have mutually opposite rotational directions R1, R2 as in the embodiments shown in the figures.

Figure 5:
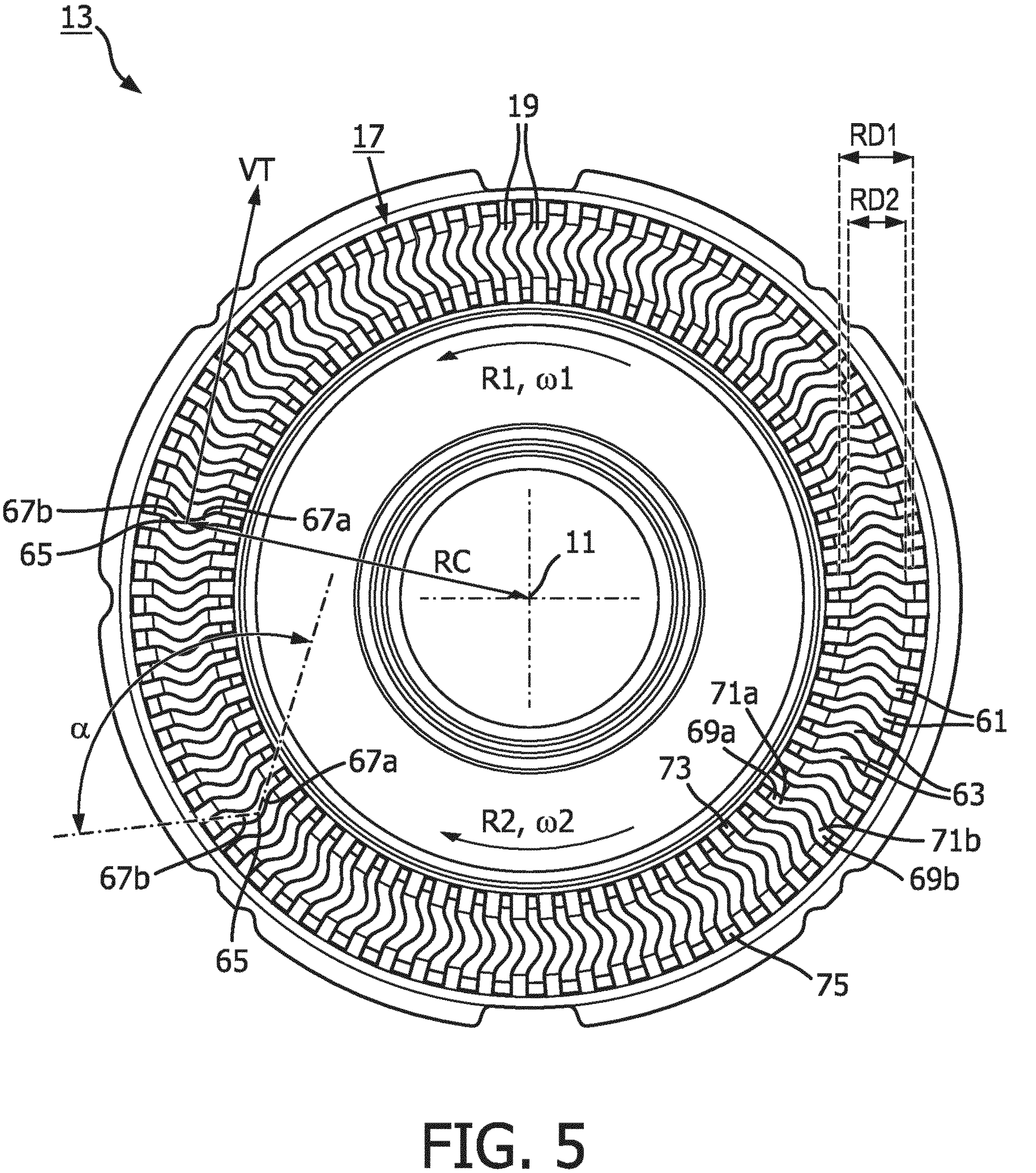
FIG. 5 is a top view of an external cutting member of the hair-cutting unit of FIG. 2.

In the embodiments of the invention shown in the figures, a particularly significant improvement of the hair-catching efficiency of the hair-cutting units 9*a*, 9*b*, 9*c* is achieved by providing the external cutting member 13 of each hair-cutting unit 9*a*, 9*b*, 9*c* of the electric shaver 1 with hair-entry openings 61 that comprise a V-shaped opening portion 63 pointing in the first rotational direction R1 of the internal cutting member 15, i.e., pointing in a direction opposite to the second rotational direction R2 of the external cutting member 13, as shown in FIG. 5. Furthermore, in this embodiment the second rotational speed ω2 of the external cutting member 13 of each hair-cutting unit 9*a*, 9*b*, 9*c* is lower than the first rotational speed ω1 of the internal cutting member 15. In particular, the second rotational speed ω2 is such that a tangential speed VT of the external cutting member 13 relative to the central axis 11 of the hair-cutting unit 9*a*, 9*b*, 9*c* is in a range between 7.5 and 50 cm/s. In this respect, said tangential speed VT is to be measured in a radial position RC of a central base point 65 of the V-shaped opening portions 63 relative to the central axis 11, as shown in FIG. 5. The central base point 65 is a point of the V-shaped opening portion 63 where the two leg portions 67*a*, 67*b* of the V-shaped opening portion 63 mutually connect, as also shown in FIG. 5. Thus, VT=2π*RC*ω2, and ω2=VT/(2π*RC). It is noted that the present invention is not limited to electric shavers wherein the hair-entry openings of the rotating external cutting members have V-shaped opening portions as in the embodiments shown in the figures. The external cutting members may for example have more conventional straight or slightly curved hair-entry slots that mainly extend in radial directions relative to the central axis of the hair-cutting units, or other well-known hair-entry opening geometries.

Figure 6A:
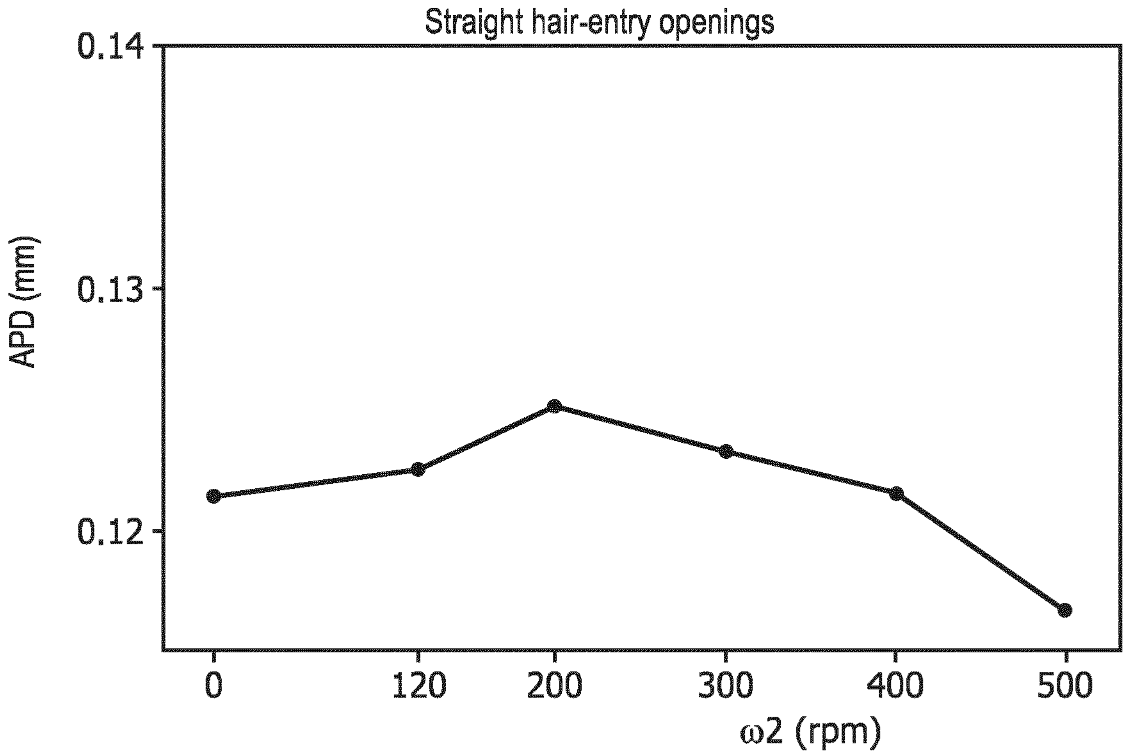
FIGS. 6*a* and 6*b* show graphs of the hair-catching efficiency of an external cutting member with straight hair-entry openings and the external cutting member of FIG. 5 as a function of the rotational speed of the external cutting member.
Figure 6B:
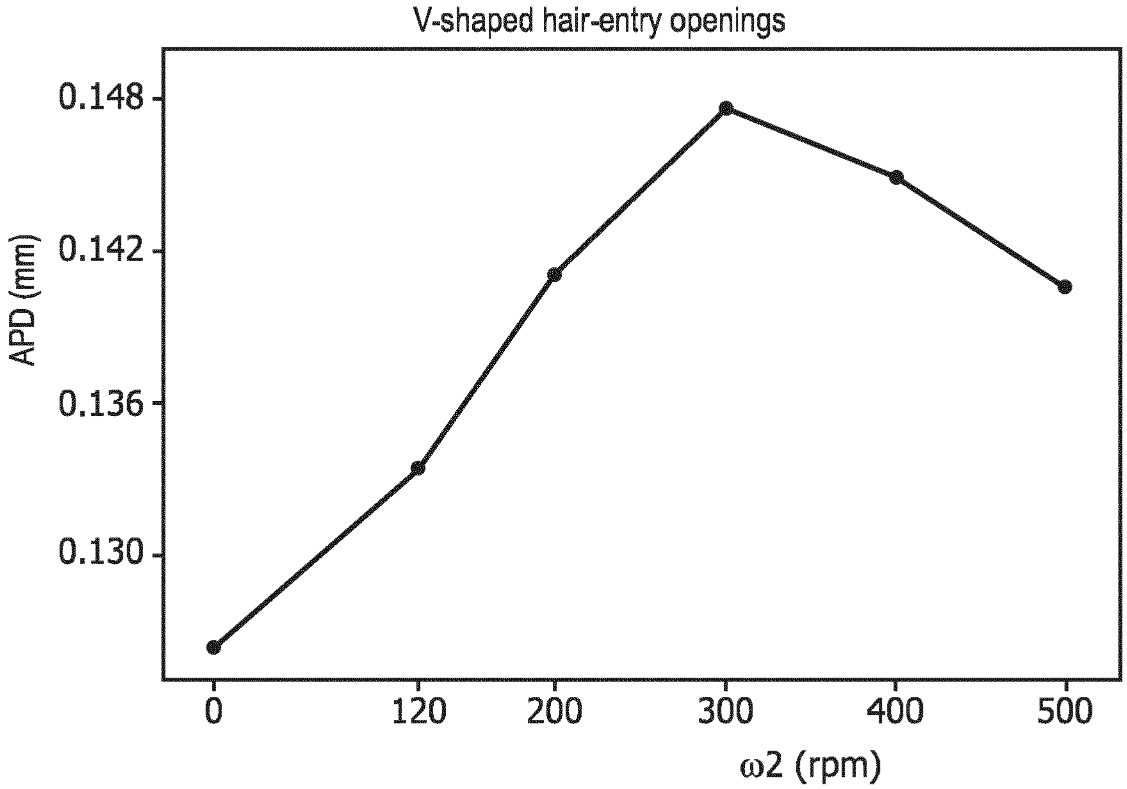

The inventors of the present invention have performed experiments in the form of numerical simulations using a mathematical model of the human skin with hairs, a mathematical model of a hair-cutting unit having an external cutting member with straight slot-shaped hair-entry openings extending substantially in radial directions relative to the central axis of the hair-cutting unit, and a mathematical model of the embodiment of the hair-cutting unit 9*a*, 9*b*, 9*c*, FIGS. 6*a* and 6*b* show graphs of the hair-catching efficiency of, respectively, the external cutting member with the straight hair-entry openings and the external cutting member 13 as a function of the second rotational speed ω2 (in rpm). In these figures, the hair-catching efficiency is expressed as an average penetration depth APD (in mm) of the hairs into the hair-entry openings of the respective external cutting members. The simulations were done for a uniform hair length of 1 mm and for a plurality of single strokes of the respective external cutting member over a particular skin area at stroke speeds between 10 cm/s and 30 cm/s. For the external cutting member 13, the radial position RC of the central base points 65 of the V-shaped opening portions 63 relative to the central axis 11 is 9 mm. For the external cutting member with the straight hair-entry openings, a radial position of a central radial point of the straight hair-entry openings is also 9 mm. Accordingly, the value ω2=500 rpm in the graphs corresponds to a value VT=47 cm/s. The graphs show a comparable hair-catching efficiency (APD) of the external cutting member with the straight hair-entry openings and the external cutting member 13 in the absence of a rotational motion of the external cutting member (ω2=0). With rotation of the external cutting member, the hair-catching efficiency (APD) of the external cutting member with the straight hair-entry openings is slightly increased, with an optimum hair-catching efficiency being achieved for a rotational speed ω2 of about 200 rpm as shown in FIG. 6*a*. As shown in FIG. 6*b*, with rotation of the external cutting member 13 of the electric shaver 1 according to this embodiment of the invention the hair-catching efficiency (APD) of the external cutting member 13 is increased to a significantly larger extent as compared with the external cutting member with the straight hair-entry openings. As shown in FIG. 6*b*, for the external cutting member 13 an optimum hair-catching efficiency is achieved for a second rotational speed ω2 of about 300 rpm. In particular, as is clear from the FIGS. 6*a* and 6*b*, a relative increase of the hair-catching efficiency (APD) as a result of the rotation of the external cutting member, i.e., a ratio between the average penetration depths (APD) of the hairs into the hair-entry openings with and without rotation of the external cutting member, was found to be significantly higher for the external cutting member 13 of the electric shaver 1 according to this embodiment of the invention than for the external cutting member with the straight radially extending hair-entry openings.

Figure 7A:
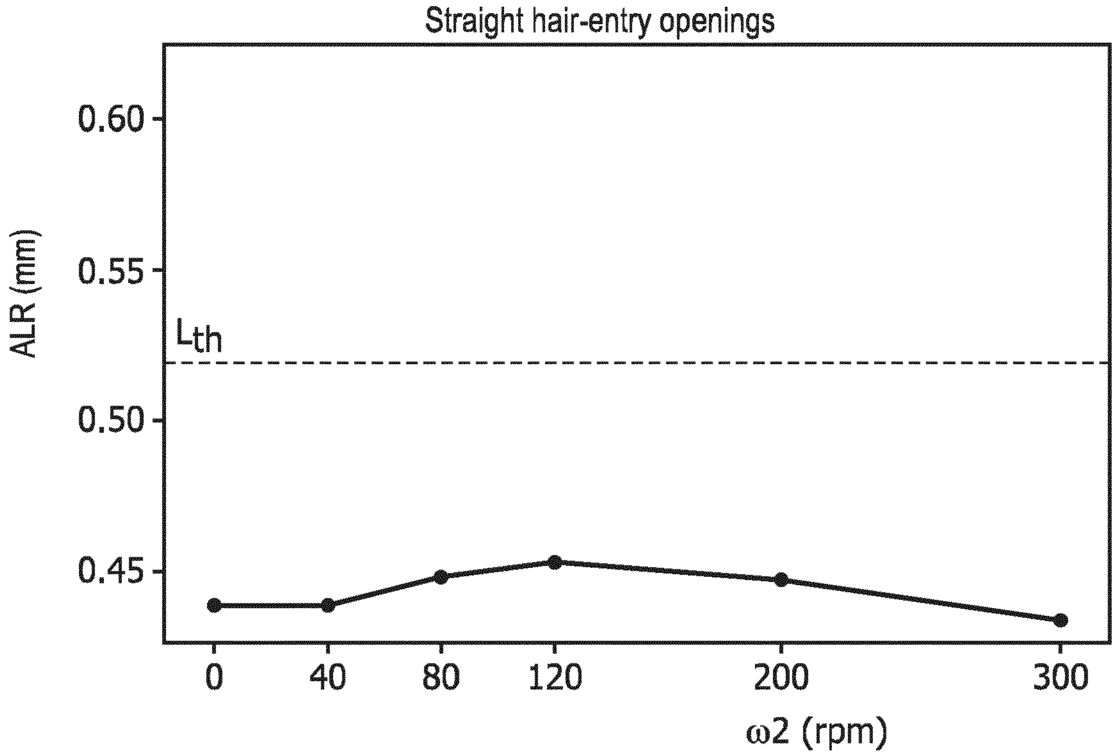
FIGS. 7*a* and 7*b* show graphs of the shaving efficiency of a hair-cutting unit having an external cutting member with straight hair-entry openings and the hair-cutting unit of FIG. 2 as a function of the rotational speed of the external cutting member of the hair-cutting unit.
Figure 7B:
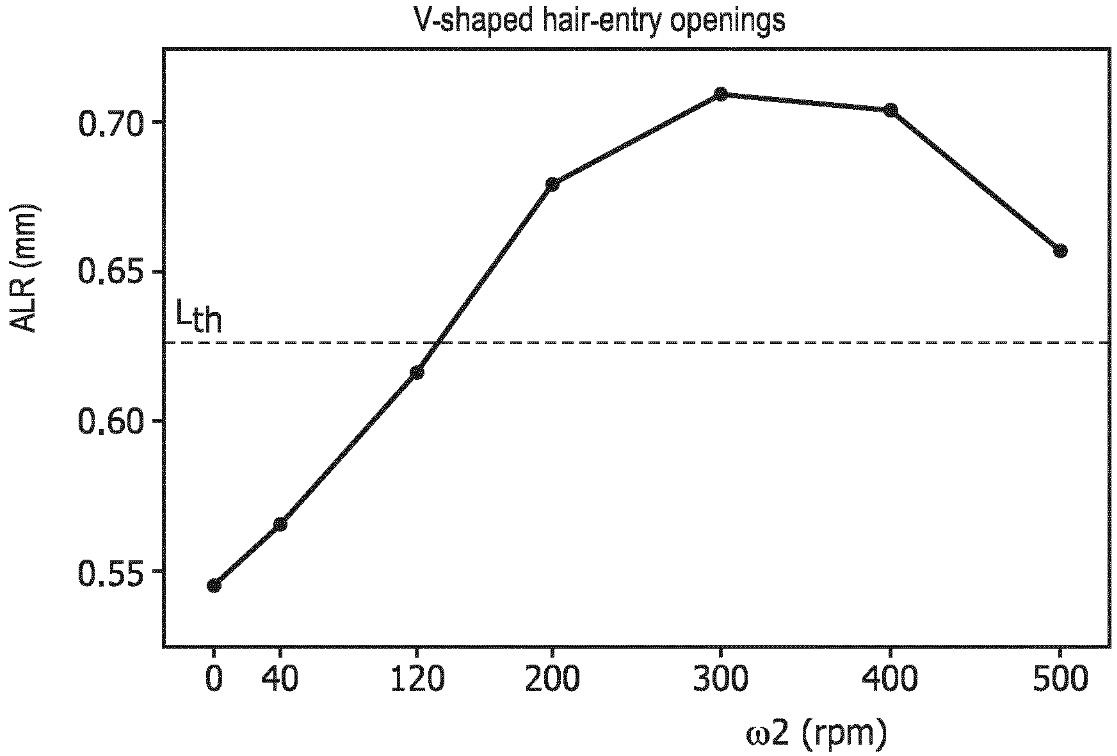

FIGS. 7*a* and 7*b* show graphs of the shaving efficiency of, respectively, the hair-cutting unit having the external cutting member with the straight hair-entry openings and the hair-cutting unit 9*a*, 9*b*, 9*c* as a function of the second rotational speed ω2 (in rpm). In these figures, the shaving efficiency is expressed as an average hair length reduction ALR (in mm) achieved by means of the respective hair-cutting units. The simulations were done for a uniform hair length of 1 mm and for a plurality of single strokes of the respective hair-cutting unit over a particular skin area at stroke speeds between 10 cm/s and 30 cm/s. For the external cutting member 13 of the hair-cutting unit 9*a*, 9*b*, 9*c*, the radial position RC of the central base points 65 of the V-shaped opening portions 63 relative to the central axis 11 is 9 mm. For the hair-cutting unit having the external cutting member with the straight hair-entry openings, a radial position of a central radial point of the straight hair-entry openings is also 9 mm. Accordingly, the value ω2=500 rpm in the graphs corresponds to a value VT=47 cm/s. The graphs show that, in the absence of a rotational motion of the external cutting member (ω2=0), the shaving efficiency (in terms of ALR) of the hair-cutting unit 9*a*, 9*b*, 9*c* is about 25% higher than the shaving efficiency of the hair-cutting unit having the external cutting member with the straight hair-entry openings. With rotation of the external cutting member, the shaving efficiency (ALR) of the hair-cutting unit having the external cutting member with the straight hair-entry openings is slightly increased, with an optimum shaving efficiency being achieved for a rotational speed ω2 of about 120 rpm as shown in FIG. 7*a*. As shown in FIG. 7*b*, with rotation of the external cutting member 13 of the hair-cutting unit 9*a*, 9*b*, 9*c* of the electric shaver 1 according to this embodiment of the invention the shaving efficiency (ALR) of the hair-cutting unit 9*a*, 9*b*, 9*c* is increased to a significantly larger extent as compared with the hair-cutting unit having the external cutting member with the straight hair-entry openings. As shown in FIG. 7*b*, for the hair-cutting unit 9*a*, 9*b*, 9*c* an optimum shaving efficiency is achieved for a second rotational speed ω2 of about 300 rpm. In particular, as is clear from the FIGS. 7*a* and 7*b*, a relative increase of the shaving efficiency (ALR) as a result of the rotation of the external cutting member, i.e., a ratio between the average hair length reduction (ALR) with and without rotation of the external cutting member, was found to be significantly higher for the hair-cutting unit 9*a*, 9*b*, 9*c* of the electric shaver 1 according to this embodiment of the invention than for the hair-cutting unit having the external cutting member with the straight radially extending hair-entry openings.

As can be derived from FIG. 7*b*, a significant increase of the shaving efficiency (ALR) of about 10% can already be achieved when the second rotational speed ω2 of the external cutting member 13 is about 80 rpm, corresponding to a value of VT of about 7.5 cm/s. As is clear from FIG. 7*a*, such a significant relative increase of the shaving efficiency (ALR) cannot be achieved by rotation of the external cutting member with the straight hair-entry openings. Furthermore, the line Lth in FIGS. 7*a* and 7*b* represents an increase of the shaving efficiency (ALR) that is considered to be particularly perceivable by the user of the electric shaver 1. For the external cutting member 13, such a particularly user-perceivable increase of the shaving efficiency (ALR) is achieved when the second rotational speed ω2 is between about 120 rpm (corresponding to VT=11.25 cm/s) and about 550 rpm (corresponding to VT=50 cm/s). Values of VT above 50 cm/s might not be preferred in view of the relatively high skin friction caused by the rotation of the external cutting member 13. Thus, in this embodiment of the invention, the second rotational speed ω2 of the external cutting member 13 is such that said tangential speed VT of the external cutting member 13, measured in the radial position RC of the central base points 65 of the V-shaped opening portions 63 of the hair-entry openings 61, is in the range between 7.5 cm/s and 50 cm/s, while a more preferred range for the value of VT is between 11.25 cm/s and 50 cm/s.

Furthermore, as shown in FIG. 7*b*, the relative increase of the shaving efficiency (ALR) in the range for the value of ω2 between about 120 rpm (VT=11.25 cm/s) and about 300 rpm (VT=28.3 cm/s) is comparable with the relative increase of the shaving efficiency (ALR) in the range for the value of ω2 between about 300 rpm (VT=28.3 cm/s) and about 550 rpm (VT=50 cm/s). Because the skin friction caused by the rotation of the external cutting member 13 is lower at lower values of VT, the range for the value of VT between 11.25 cm/s and 30.0 cm/s, according to a further embodiment of the invention, provides a preferred combination of the significant increase of the hair-catching and shaving efficiencies as described here before and a minimum degree of additional skin friction caused by the rotation of the external cutting member 13.

Similar experiments, done for hair-cutting units having an external cutting member wherein the hair-entry openings, and in particular the V-shaped opening portions thereof, are arranged at larger or smaller radial distances from the central axis as compared to the radial distance RC of the external cutting member 13 as described here before, have shown that the ranges for the value of VT in this embodiment of the invention as described here before, within which the benefits of this embodiment of the invention as described here before are achieved, are independent from said radial distance. In other words, in embodiments of the invention wherein the V-shaped opening portions 63 of the hair-entry openings 61 are arranged at a larger, respectively a smaller radial distance RC from the central axis 11, the second rotational speed ω2 of the external cutting member 13 should be decreased, respectively increased proportionally to said radial distance RC in order to achieve comparable results as regards improved hair-catching and shaving efficiencies. For example, where in the embodiment described here before the second rotational speed ω2 is about 300 rpm (with RC=9 mm), comparable results would be achieved at a second rotational speed ω2 of about 225 rpm in an embodiment wherein RC=12 mm, and at a second rotational speed ω2 of about 450 rpm in an embodiment wherein RC=6 mm.

As shown in FIG. 5, the hair-entry openings 61 of the external cutting member 13 each extend over a first radial distance RD1 in a radial direction relative to the central axis 11. The V-shaped opening portions 63 of the hair-entry openings 61 each extend over a second radial distance RD2 in the radial direction relative to the central axis 11. In the embodiment shown in FIG. 5, a ratio RD2/RD1 is about 0.75. A particularly significant improvement of the hair-catching and shaving efficiencies is achieved in embodiments of the electric shaver wherein said ratio RD2/RD1 is at least 0.5. Improvements of the hair-catching and shaving efficiencies may however also be achieved for smaller values of said ratio, in particular when the first radial distance RD1 over which the hair-entry openings 61 extend is relatively large.

In the embodiment shown in FIG. 5, the hair-entry openings 61 of the external cutting member 13 further comprise a radially inner straight opening portion 69*a* and a radially outer straight opening portion 69*b*. The radially inner straight opening portion 69*a* is connected to the V-shaped opening portion 63 of the hair-entry opening 61 at a first end 71*a* of the V-shaped opening portion 63 which faces the central axis 11. The radially outer straight opening portion 69*b* is connected to the V-shaped opening portion 63 at a second end 71*b* of the V-shaped opening portion 63 which faces away from the central axis 11. The radially inner and outer straight opening portions 69*a*, 69*b* each have a main direction of extension in a radial direction relative to the central axis 11. In this embodiment, the radially inner straight opening portions 69*a* provide a relatively high hair-catching efficiency for hairs that approach the hair-entry openings 61 of the external cutting member 13 via an inner circumferential arca 73 of the annular shaving area 17 during random motion of the hair-cutting unit 9*a*, 9*b*, 9*c* over the user's skin. During such random motion, the radially outer straight opening portions 69*b* provide a relatively high hair-catching efficiency for hairs that approach the hair-entry openings 61 via an outer circumferential arca 75 of the annular shaving area 17, while the V-shaped opening portions 63 provide a relatively high hair-catching efficiency for hairs that approach the hair-entry openings 61 via a central arca of the annular shaving arca 17.

Furthermore, FIG. 5 shows a V-angle a of the V-shaped opening portions 63 of the hair-entry openings 61, which is defined as the angle enclosed by the two leg portions 67*a*, 67*b* of the V-shaped opening portions 63. In the embodiment shown in FIG. 5, the V-angle a is about 115°. A preferred range for the V-angle a is the range from 60° to 135°. With a value of the V-angle a in this preferred range, the V-shaped opening portions 63 provide, in addition to the improved hair-catching and shaving efficiencies, a stretching effect on the skin in two mutually diverging directions during rotation of the external cutting member 13 in the second rotational direction R2. Said skin-stretching effect results in a reduction of skin doming into the hair-entry openings 61 and, thereby, in a reduction of skin irritation caused by the shaving process.

Figure 8:
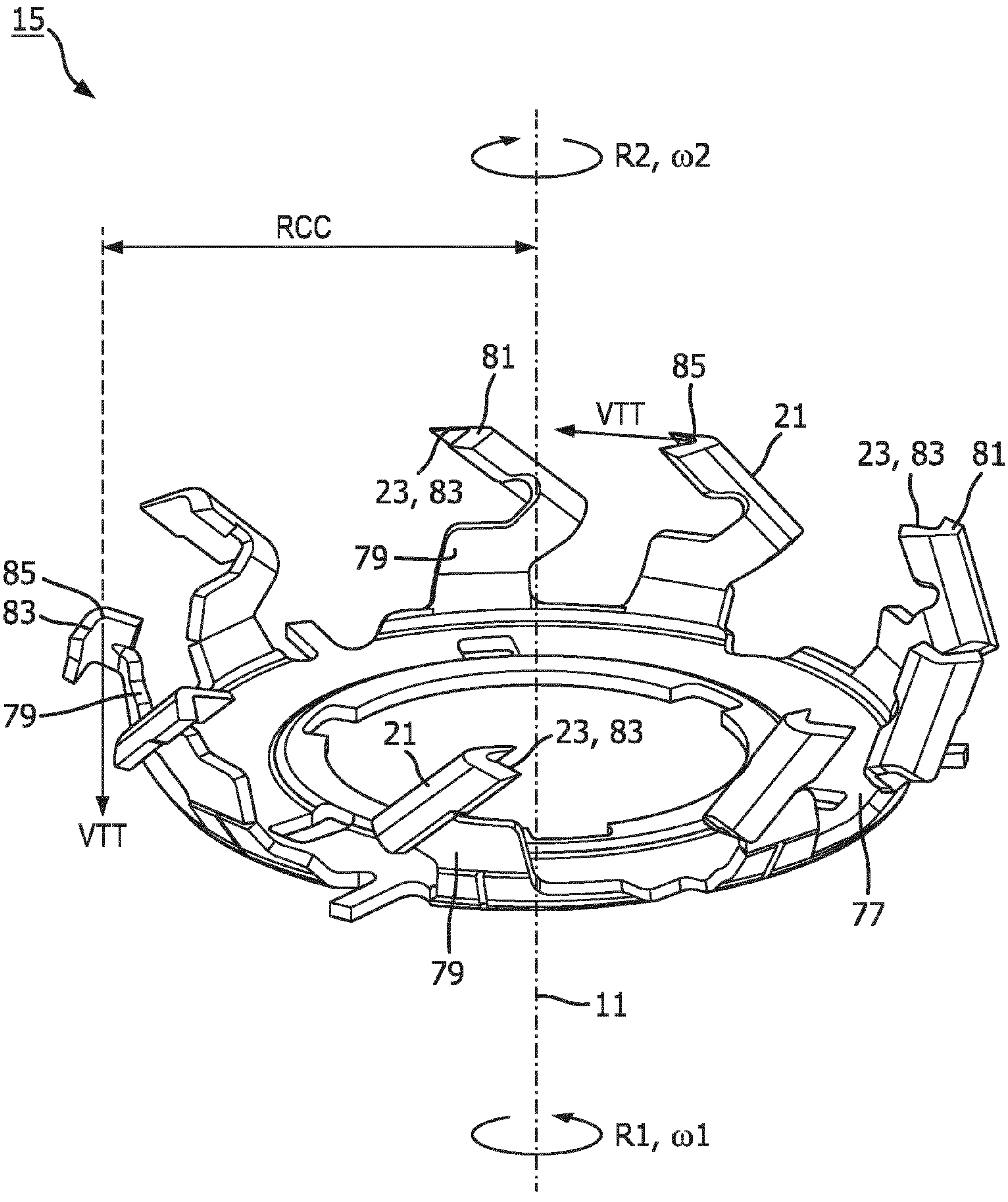
FIG. 8 shows an internal cutting member of the hair-cutting unit of FIG. 2.

FIG. 8 shows the internal cutting member 15 of the hair-cutting unit 9*a*, 9*b*, 9*c*, the first rotational direction R1 of the internal cutting member 15 about the central axis 11 of the hair-cutting unit 9*a*, 9*b*, 9*c*, and the second rotational direction R2 of the external cutting member 13. Each cutting clement 21 of the annular array of cutting elements 21 is connected to a carrier 77 of the internal cutting member 15 via a bent connecting clement 79. The carrier 77, the cutting elements 21 and the bent connecting elements 79 may be integrally formed from a single metal plate in a manner known to the person skilled in the art. The cutting edge 23 of each cutting clement 21 is provided on the leading or front edge (with respect to the first rotational direction R1) of an upper surface 81 of the cutting clement 21. The carrier 77 is coupled to one of the three drive spindles 41 of the drive system 27, which is described here before, in a manner well known to the person skilled in the art. A coupling between the drive spindle 41 and the carrier 77 is therefore not shown in FIG. 8.

In the embodiment shown in FIG. 8, the cutting edges 23 of the cutting elements 21 of the internal cutting member 15 each comprise a V-shaped cutting edge portion 83 pointing in the second rotational direction R2 of the external cutting member 13, i.e., pointing in a direction opposite to the first rotational direction R1 of the internal cutting member 15 and opposite to the direction wherein the V-shaped opening portions 63 of the hair-entry openings 61 of the external cutting member 13 are pointing. In the embodiment shown in FIG. 8, the V-shaped cutting edge portions 83 each extend over the full extension of the cutting edge 23. The V-shaped cutting edge portions 83 of the cutting edges 23 of the internal cutting member 15 and the V-shaped opening portions 63 of the hair-entry openings 61 of the external cutting member 13 are aligned in a tangential direction relative to the central axis 11. Said alignment implies that a central base point 85 of each V-shaped cutting edge portion 83 is arranged at a radial distance RCC from the central axis 11 which is substantially equal to the radial position RC of the central base points 65 of the V-shaped opening portions 63 relative to the central axis 11. In this embodiment, skin irritation caused by the shaving process is further reduced as a result of the fact that, by the interaction of the V-shaped opening portions 63 of the hair-entry openings 61 of the external cutting member 13 and the V-shaped cutting edge portions 83 of the cutting elements 21 of the internal cutting member 15, hairs caught by the hair-entry openings 61 are mainly cut in the central areas of the V-shaped opening portions 63 where the degree of skin doming into the hair-entry openings 61 is at a minimum level. It is however noted that the invention also covers embodiments wherein the cutting edges 23 of the cutting elements 21 of the internal cutting member 15 have a more conventional shape, such as a substantially straight shape or a slightly curved shape, each with a main direction of extension in the radial direction.

The influence of the first rotational speed ω1 of the internal cutting member 15 on the hair-catching efficiency of the hair-cutting unit 9*a*, 9*b*, 9*c* is limited. The first rotational speed ω1 may therefore be selected mainly on the basis of the required hair-cutting efficiency of the cutting elements 21 of the rotating internal cutting member 15, as is known to the person skilled in the art. In the embodiment of FIG. 8, a preferred range of the first rotational speed ω1 is such that a tangential speed VTT of the cutting elements 21 of the internal cutting member 15 relative to the central axis 11, measured at the radial distance RCC from the central axis 11 as shown in FIG. 8, is in a range between 70 and 375 cm/s, more preferably in a range between 140 and 250 cm/s. In the present embodiment, wherein RCC=9 mm, said ranges of said tangential speed VTT correspond with ranges of the first rotational speed ω1 of, respectively, between about 750 and 4000 rpm and between about 1500 and 2700 rpm.

The inventors of the present invention realized that, for an electric shaver wherein the external cutting members of the hair-cutting units are rotated about the central axes of the hair-cutting units to increase the hair-catching efficiency, the hair-catching efficiency may also depend on other parameters than the second rotational speed of the external cutting members. In particular, the inventors realized that the hair-catching efficiency may depend on particular user specific ways in which the user manipulates the electric shaver relative to the user's body and particular user specific hair properties. The inventors also realized that different users may experience the rotation of the external cutting members differently depending on specific skin properties. Accordingly, in the absence of any further measures the second rotational speed of the external cutting members may not be optimal under all circumstances of use or operation of the electric shaver by the user and may in general not be optimal for all users of the electric shaver.

Figure 9:
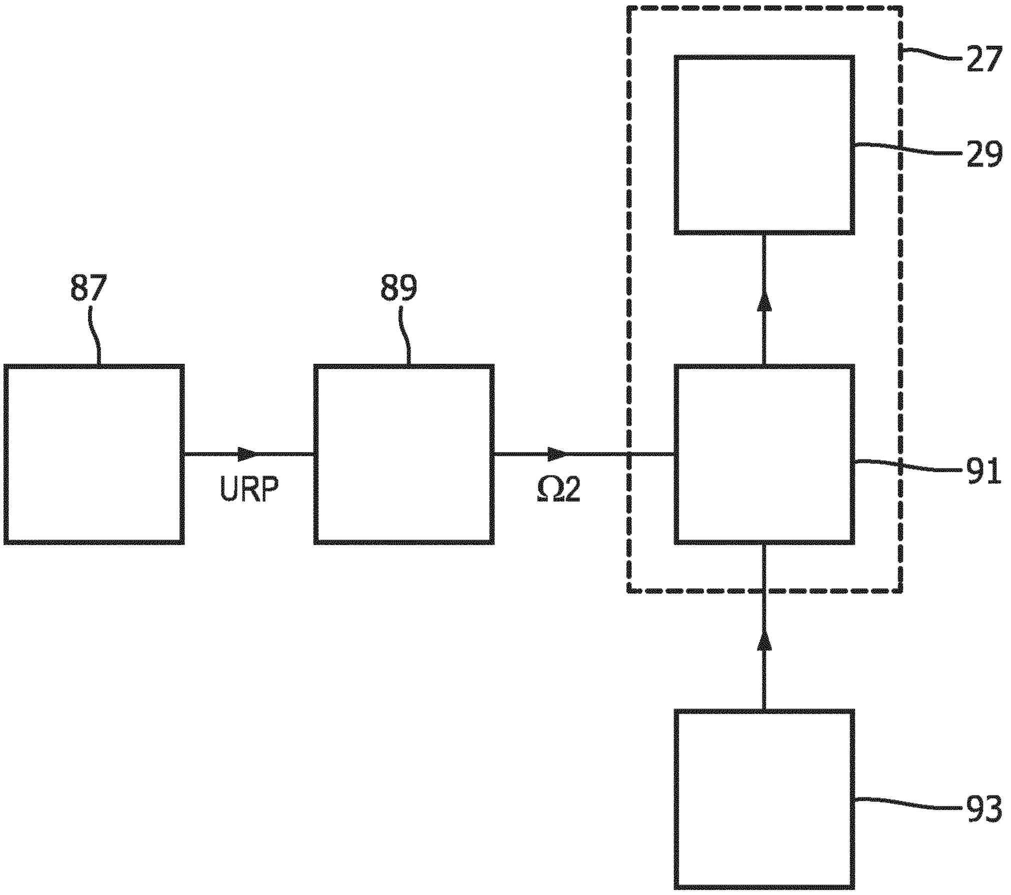
FIG. 9 schematically shows a detection system, a processor and the drive system of the electric shaver of FIG. 1.

To prevent or at least mitigate this problem, in the electric shaver 1 according to the invention the second rotational speed ω2 of the external cutting members 13 of the hair-cutting units 9*a*, 9*b*, 9*c* is automatically adapted such that the hair-catching efficiency will remain on an optimum or at least a desired level independent from or less dependent on the specific way in which the user manipulates the electric shaver 1, and/or independent from or less dependent on the user specific hair properties, and/or such that the rotation of the external cutting member is experienced by the user as acceptable independent from or less dependent on the user specific skin properties. For this purpose, as schematically shown in FIG. 9, in accordance with the invention the electric shaver 1 comprises a detection system 87 which is configured and arranged to measure at least one user-related parameter. wherein said user-related parameter relates to the skin or hairs of the user of the electric shaver 1 or relates to the manipulation of the electric shaver 1 by the user relative to the body of the user. Furthermore, in accordance with the invention the electric shaver 1 comprises a processor 89 which is configured and arranged to control the drive system 27 such that the second rotational speed ω2, at which the drive system 27 rotates the external cutting members 13 about the central axes 11 of the hair-cutting units 9*a*, 9*b*, 9*c*, depends on said at least one measured user-related parameter. As shown in FIG. 9. during use the detection system 87 may generate an output signal URP that represents a value of the measured user-related parameter. The output signal URP may be received by the processor 89, which may generate an output signal Ω2 that represents the second rotational speed ω2 of the external cutting members 13 to be realized by the drive system 27. The drive system 27 may comprise a power-control module 91 which is connected to a battery 93 and configured to power the motor 29, based on the output signal Ω2, such that the drive system 27 realizes the second rotational speed ω2 of the external cutting members 13. For this purpose, the power-control module 91 may comprise a feedback speed control which is known to the person skilled in the art and, therefore, not discussed in detail.

The positions of the processor 89, the power-control module 91 and the battery 93 in the main housing 3 of the electric shaver 1 are schematically shown in FIG. 3 as an example. Examples of the user-related parameters, detection systems to measure the user-related parameters, and specific ways of controlling the second rotational speed ω2 of the external cutting members 13 depending on the user-related parameters will be described in the following with reference to further embodiments of the present invention.

It is noted that the invention also covers embodiments wherein the processor and/or the detection system are arranged separately from the main housing 3 and the shaving unit 5, e.g., in a separate electronic device such as a smart phone. In such embodiments, the term "electric shaver" is to be understood as a "shaving system" that includes such a separate electronic device.

Examples of the user-related parameter that may be measured by the detection system 87 include a location of the electric shaver 1 on the body of the user, a cumulative amount of shaving time of the electric shaver 1 for a plurality of different areas of the user's body during a shaving session, a motion speed at which the user moves the electric shaver 1 over the user's body, a pressure or force at which the user presses the electric shaver 1 against the body, a parameter relating to a skin property of the user, and a parameter relating to a hair property of the user. The mentioned location of the electric shaver 1, the mentioned cumulative amount of shaving time, the mentioned motion speed and the mentioned pressure are each an example of a user-related parameter relating to the manipulation of the electric shaver 1 by the user relative to the body of the user. In other words, in these examples the value of the user-related parameter depends on how the user manipulates, e.g., places, moves or presses, the electric shaver 1 relative to the user's body. The detection system 87 may be configured and arranged to measure only one user-related parameter or to measure two or more user-related parameters. Accordingly, the processor 89 may be configured and arranged to control the second rotational speed ω2 of the external cutting members 13 depending on only one user-related parameter or depending on two or more user-related parameters.

Figure 10A:
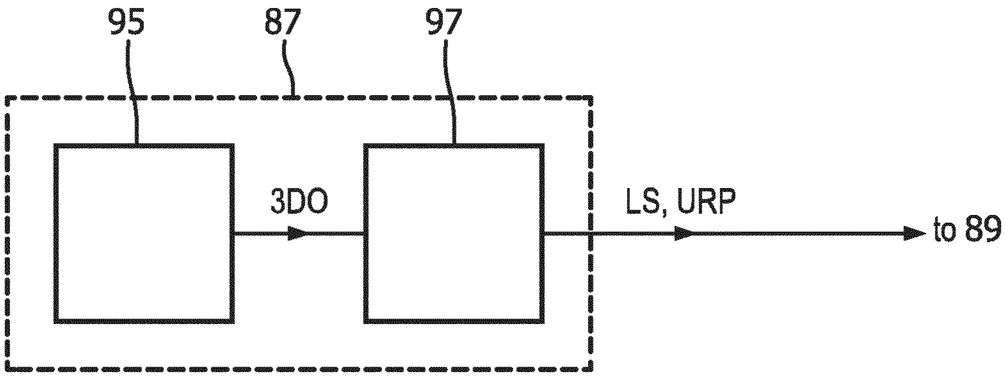
FIGS. 10*a*-10*f* schematically show different embodiments of the detection system shown in FIG. 9.

In an embodiment of the electric shaver 1 according to the invention, wherein the user-related parameter comprises the location of the electric shaver 1 on the body of the user, the detection system 87 is configured and arranged to measure the location of the electric shaver 1 on the body of the user. For this purpose, the detection system 87 may comprise any suitable detector as is known to the person skilled in the art. As an example, the detection system 87 may comprise a system for determining a location of a device on a surface of a body part of a subject as disclosed by WO 2020/182698 A1 in the name of the applicant. In such an example, as schematically shown in FIG. 10*a*, the detection system 87 comprises an orientation sensor 95, for example an inertial measurement unit (IMU) sensor, arranged in the main housing 3 (as schematically shown in FIG. 3) or in the shaving unit 5 of the electric shaver 1 to measure a sequence of 3D orientations of the electric shaver 1 during use and generate a corresponding output signal 3DO. In this example, the detection system 87 further comprises a processing unit 97 which is configured to compare the sequence of 3D orientations of the electric shaver 1 with normal vectors on a 3D representation of the body or a body part of the user, e.g., the face and neck areas, stored in the processing unit 97. The processing unit 97 is further configured to determine, from said comparison, the location of the electric shaver 1 on the body or body part based on the positions of the normal vectors on the 3D representation and to generate a corresponding output signal LS, as an embodiment of the output signal URP shown in FIG. 9 which is supplied to the processor 89. Further details of this detection system are disclosed by WO 2020/182698 A1. In this embodiment. the processor 89 may for example be configured to apply a relatively low second rotational speed ω2 of the external cutting members 13 when the detection system 87 detects that the electric shaver 1 is present on an area of the user's body where the skin is known for having a relatively high sensitivity, such as the neck area, and to apply a relatively high second rotational speed ω2 of the external cutting members 13 when the detection system 87 detects that the electric shaver 1 is present on an area of the user's body where the skin is known for having a relatively low sensitivity, such as the cheek area. In this way the user may experience the rotation of the external cutting members 13 as acceptable independent from or less dependent on the location where the electric shaver 1 is actually shaving. Alternatively, the processor 89 may adapt the second rotational speed ω2 depending on the detected location of the electric shaver 1 based on different location dependent properties, e.g., based on hair properties of an average user in different areas of the body. The processing unit 97 of the detection system 87 may be part of the processor 89 or separate from the processor 89, as is shown in FIG. 10*a*.

Figure 10B:
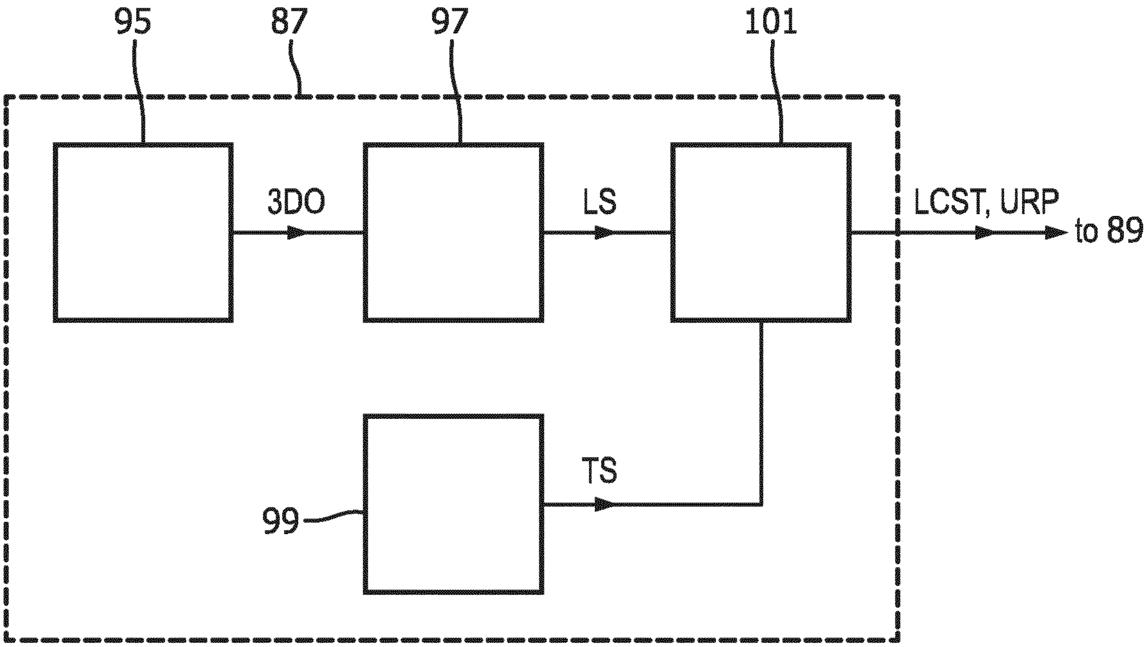

In a further embodiment of the electric shaver 1 according to the invention, the user-related parameter comprises the cumulative amount of shaving time of the electric shaver 1 for a plurality of different areas of the user's body during a shaving session. In this further embodiment, as shown in FIG. 10*b*, the detection system 87 comprises the orientation sensor 95 and the processing unit 97, as described here before with reference to the embodiment of FIG. 10*a*, to measure the location of the electric shaver 1 on the body of the user and generate the corresponding output signal LS. In this embodiment, the detection system 87 further comprises a timer 99 configured to output a timing signal TS. The detection system 87 further comprises a further processing unit 101 which is configured to determine, based on the output signal LS of the processing unit 97 and the timing signal TS of the timer 99, a cumulative amount of shaving time of the electric shaver 1 for each of a plurality of different areas of the user's body. The further processing unit 101 generates an output signal LCST, which is supplied to the processor 89 as an embodiment of the output signal URP shown in FIG. 9 and represents the cumulative amount of shaving time for the area of the user's body on which the electric shaver 1 is actually shaving. In this embodiment, the processor 89 may for example be configured to decrease the second rotational speed ω2 of the external cutting members 13 when the output signal LCST of the further processing unit 101 indicates that the cumulative amount of shaving time for the area of the user's body on which the electric shaver 1 is actually shaving exceeds a predefined time threshold. In this way, an increase of skin irritation by the rotation of the external cutting member 13, which may occur when the user is shaving for a too long time on the same skin area, is limited or prevented. The processing unit 97, the timer 99 and the further processing unit 101 of the detection system 87 may be part of the processor 89 or separate from the processor 89, as is shown in FIG. 10*b*.

Figure 10C:
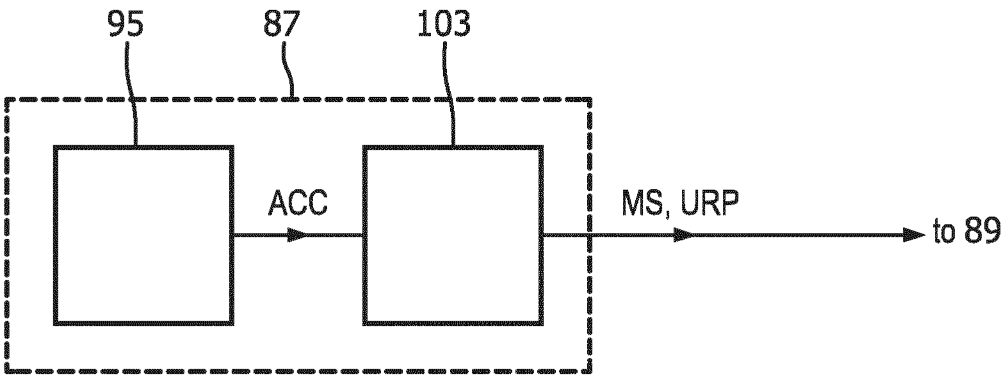

In a further embodiment of the electric shaver 1 according to the invention, the user-related parameter comprises the motion speed at which the user moves the electric shaver 1 over the user's body. In this further embodiment, as shown in FIG. 10*c*, the detection system 87 may comprise the orientation sensor 95, as described here before with reference to the embodiments of FIGS. 10*a* and 10*b*, and a processing unit 103. In this embodiment, the orientation sensor 95 is an IMU sensor as described here before. The processing unit 103 is configured to receive an output signal ACC generated by the IMU sensor and representing a measured acceleration of the electric shaver 1. The processing unit 103 is configured to determine from the measured acceleration the motion speed at which the electric shaver 1 is moved over the user's body and to generate a corresponding output signal MS, as an embodiment of the output signal URP shown in FIG. 9 which is supplied to the processor 89. The processing unit 103 of the detection system 87 may be part of the processor 89 or separate from the processor 89, as is shown in FIG. 10*c*. Instead of the IMU sensor, the detection system 87 may comprise a displacement sensor 105 arranged in the shaving unit 5 as schematically shown in FIG. 4A, such as an optical displacement sensor which is known to the skilled person. In such a case, the processing unit 103 is configured to determine the motion speed of the electric shaver 1 from the displacements measured by the displacement sensor 105.

A known problem with electric shavers is that the hair-catching efficiency of the hair-cutting units decreases when the user increases the motion speed of the electric shaver over the body. To mitigate this problem, in the present embodiment the processor 89 is configured to increase the second rotational speed ω2 of the external cutting members 13 of the hair-cutting units 9*a*, 9*b*, 9*c* when the motion speed of the electric shaver 1 measured by the detection system 87 increases. By increasing the second rotational speed ω2, the hair-catching efficiency may be increased, i.e., at least within a predefined range of the second rotational speed ω2 which depends on the detailed design of the external cutting member 13, such as the range between 0 and 300 rpm for the embodiment of the external cutting member 13 as shown in FIG. 6*b*. The increase of the hair-catching efficiency achieved by increasing the second rotational speed ω2 may partially or even fully compensate the decrease of the hair-catching efficiency caused by the increase of the motion speed of the electric shaver 1. The processor 89 may be configured to gradually increase the second rotational speed ω2 with increasing measured motion speed. Alternatively, the processor 89 may be configured to increase the second rotational speed ω2 stepwise at particular threshold values of the measured motion speed. In another example, the second rotational speed ω2 is set to a first predefined value when the measured motion speed is below a first threshold value, is set to a second predefined value higher than the first predefined value when the measured motion speed is above a second threshold value higher than the first threshold value, and is set to a value between the first and the second predefined values proportionally to a value of the measured motion speed between the first and the second threshold values.

With respect to the present embodiment, the inventors also found that, to achieve an optimum improvement of the hair-catching efficiency, the processor 89 must set the second rotational speed ω2 of the external cutting members 13 of the hair-cutting units 9*a*, 9*b*, 9*c* such that the tangential speed VT of the external cutting members 13 relative to the central axes 11 of the hair-cutting units 9*a*, 9*b*, 9*c*, as defined here before, is higher than the motion speed measured by the detection system 87. It was found that a majority of the users of an electric shaver move the shaver over the body at a speed between 10 cm/s and 30 cm/s. For the embodiment of the external cutting members 13, a tangential speed VT of about 14 cm/s (corresponding to ω2=150 rpm) was found to provide an optimum hair-catching efficiency for a motion speed of 10 cm/s. For motion speeds of 20 cm/s and 30 cm/s, the optimum value of the tangential speed VT of the external cutting members 13 was found to be, respectively, about 28 cm/s (corresponding to ω2=300 rpm) and about 38 cm/s (corresponding to ω2=400 rpm).

Figure 10D:
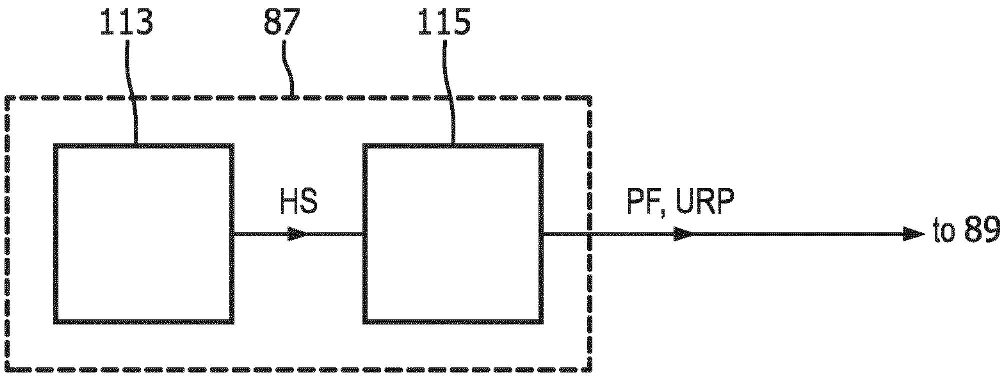
Figure 10E:
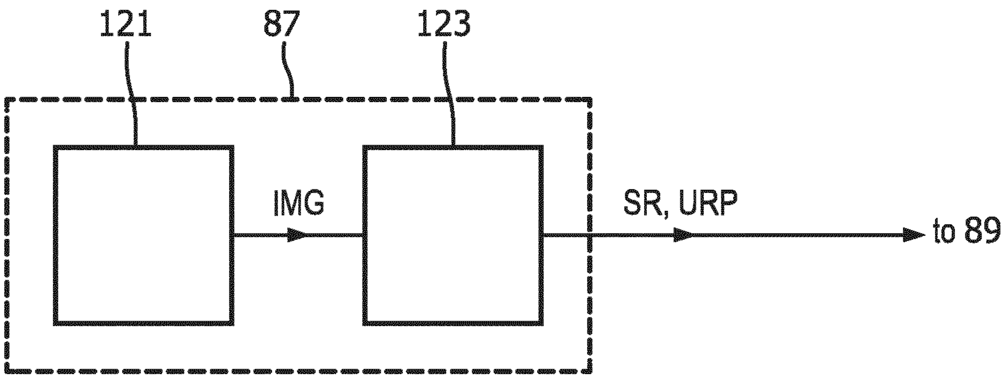

In an embodiment of the electric shaver 1 wherein the user-related parameter comprises the pressure or force at which the user presses the electric shaver 1 against the body, the detection system 87 is configured and arranged to measure said pressure or force. For this purpose, the detection system 87 may comprise any suitable detector as is known to the person skilled in the art. As an example, the detection system 87 may comprise a pressure sensing system as disclosed by WO 2020/212276 A1 in the name of the applicant. The main parts of this known pressure sensing system are schematically shown in FIG. 3 and comprise a pair of blade springs 107 by means of which the supporting structure 7 of the shaving unit 5 is elastically suspended relative to the main housing 3 in a direction parallel to a central axis 109 of the shaving unit 5, a permanent magnet 111 mounted to the supporting structure 7, and a hall sensor 113 mounted to the main housing 3 in a position close to the magnet 111. As a result of the use of the blade springs 107, a distance between the permanent magnet 111 and the hall sensor 113 parallel to the central axis 109 of the shaving unit 5 depends on the pressure exerted on the shaving unit 5 parallel to the central axis 109 of the shaving unit 5. As schematically shown in FIG. 10*d*, in this embodiment the hall sensor 113 generates an output signal HS which represents a magnetic field strength of the magnet 111 measured at the location of the hall sensor 113, which depends on said distance between the magnet 111 and the hall sensor 113 and, consequently, on the pressure at which the shaving unit 5 is pressed against the body. As schematically shown in FIG. 10*d*, in this embodiment the detection system 87 further comprises a processing unit 115 configured to determine the pressure or force at which the shaving unit 5 is pressed against the body from the output signal HS of the hall sensor 113, the known magnetic properties of the permanent magnet 111 and the hall sensor 113, and the known elastic properties of the blade springs 107. The processing unit 115 generates an output signal PF representing the determined pressure or force, as an embodiment of the output signal URP shown in FIG. 9 which is supplied to the processor 89. The processing unit 115 of the detection system 87 may be part of the processor 89 or separate from the processor 89, as is shown in FIG. 10*d*. Further details of the pressure sensing system are disclosed by WO 2020/212276 A1. It is noted that, instead of the pressure sensing system as described here before, the detection system 87 may have a different type of pressure sensor, e.g., one or more mechanical pressure sensors 117 of a type known to the skilled person that may be arranged on the shaving unit 5, as schematically shown in FIG. 4*a*.

When said pressure or force increases, the degree of skin doming into the hair-entry openings 61 of the external cutting members 13 increases, which may result in an increase of skin irritation experienced by the user. It was found that the degree of skin doming into the hair-entry openings 61 may be reduced by increasing the second rotational speed ω2 of the external cutting members 13. Therefore, as a first example relating to the present embodiment, the processor 89 is configured to increase the second rotational speed ω2 when the detection system 87 detects an increase of the pressure or force exerted on the shaving unit 5. Thereby, an increase of skin doming and an increase of the related skin irritation resulting from an increase of said pressure or force can be prevented or limited.

When said pressure or force increases, the friction between the skin and the rotating external cutting members 13 increases, which may also result in an increase of skin irritation experienced by the user. Because said skin friction may be reduced by reducing the second rotational speed ω2 of the external cutting members 13, in a second example relating to the present embodiment the processor 89 is configured to decrease the second rotational speed ω2 when the detection system 87 detects an increase of the pressure or force exerted on the shaving unit 5. Thereby, an increase of skin friction and an increase of the related skin irritation resulting from an increase of said pressure or force can be prevented or limited. In this embodiment, the electric shaver 1 may be provided with a user interface by means of which the user can select a preferred way in which the processor 89 adapts the second rotational speed ω2 in dependence on the measured pressure, i.e., such as to control skin doming into the hair-entry openings 61 according to the first example described here before, or such as to control skin friction according to the second example described here before.

In an embodiment of the electric shaver 1 according to the invention wherein the user-related parameter comprises a parameter relating to a skin property of the user, the detection system 87 is configured and arranged to measure said parameter relating to said skin property of the user. In an example said skin-property related parameter is skin redness, which is a well-known skin property that is influenced by the shaving process. The degree of skin redness is considered to be an indication of the degree of skin irritation caused by the shaving process. In this example, the detection system 87 may have an optical colour sensor 119 arranged in the shaving unit 5, as schematically shown in FIG. 4*a*, and configured to detect the degree of redness of the skin. Alternatively, as schematically shown in FIG. 10*c*, the detection system 87 may have a camera 121 which may be arranged separately from the main housing 3 and the shaving unit 5, e.g., in a smart phone. The camera 121 is configured to generate an output signal IMG representing an image of the user's skin. The detection system 87 further comprises a processing unit 123 configured to analyse the image generated by the camera 121, to determine the degree of skin redness based on said analysis, and to generate a corresponding output signal SR as an embodiment of the output signal URP shown in FIG. 9 which is supplied to the processor 89. In this example the processor 89 may be configured to reduce the second rotational speed ω2 of the external cutting members 13 when the detection system 87 measures an increase of the skin redness. The processing unit 123 of the detection system 87 may be part of the processor 89 or separate from the processor 89, as is shown in FIG. 10*c*. Instead of the skin redness, the processor 89 may control the second rotational speed ω2 of the external cutting members 13 depending on another type of skin property, in particular when such a skin property is influenced by the second rotational speed ω2 of the external cutting members 13 and/or when such a skin property influences the hair-catching efficiency of the external cutting members 13.

Figure 10F:
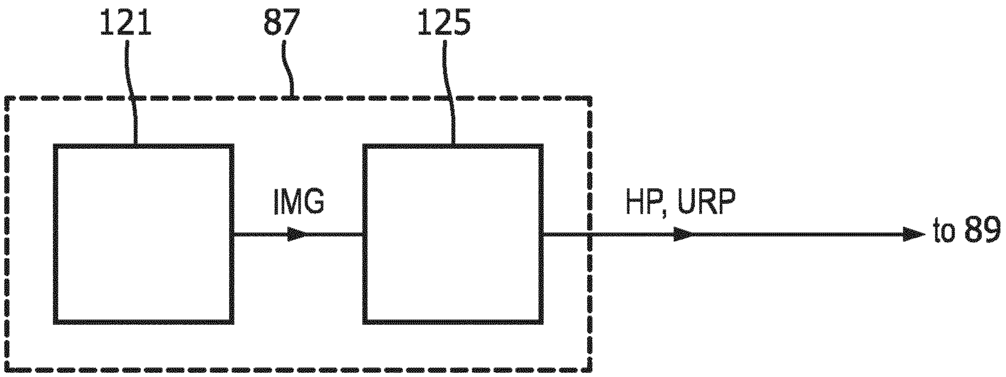

In an embodiment of the electric shaver 1 according to the invention wherein the user-related parameter comprises a parameter relating to a hair property of the user, the detection system 87 is configured and arranged to measure said parameter relating to said hair property of the user. In an example, said hair property is a hair property that may influence the hair-catching efficiency of the external cutting members 13 of the hair-cutting units 9*a*, 9*b*, 9*c*. Examples of such hair properties include hair length, hair thickness or hair density on the skin. As schematically shown in FIG. 10*f*, similar to the embodiment shown in FIG. 10*c* the detection system 87 may have the camera 121 configured to generate an output signal IMG representing an image of the user's skin. The detection system 87 further comprises a processing unit 125 configured to analyse the image generated by the camera 121, to determine the hair property based on said analysis, and to generate a corresponding output signal HP as an embodiment of the output signal URP shown in FIG. 9 which is supplied to the processor 89. When for example the hair property is the hair length or the hair density on the skin, the processor 89 may be configured to increase the second rotational speed ω2 of the external cutting members 13 when the detection system 87 measures an increase of the hair length or the hair density. Thereby, the hair-catching efficiency for longer hairs or higher hair densities may be increased. The processing unit 125 of the detection system 87 may be part of the processor 89 or separate from the processor 89, as is shown in FIG. 10*f*.

Figure 11:
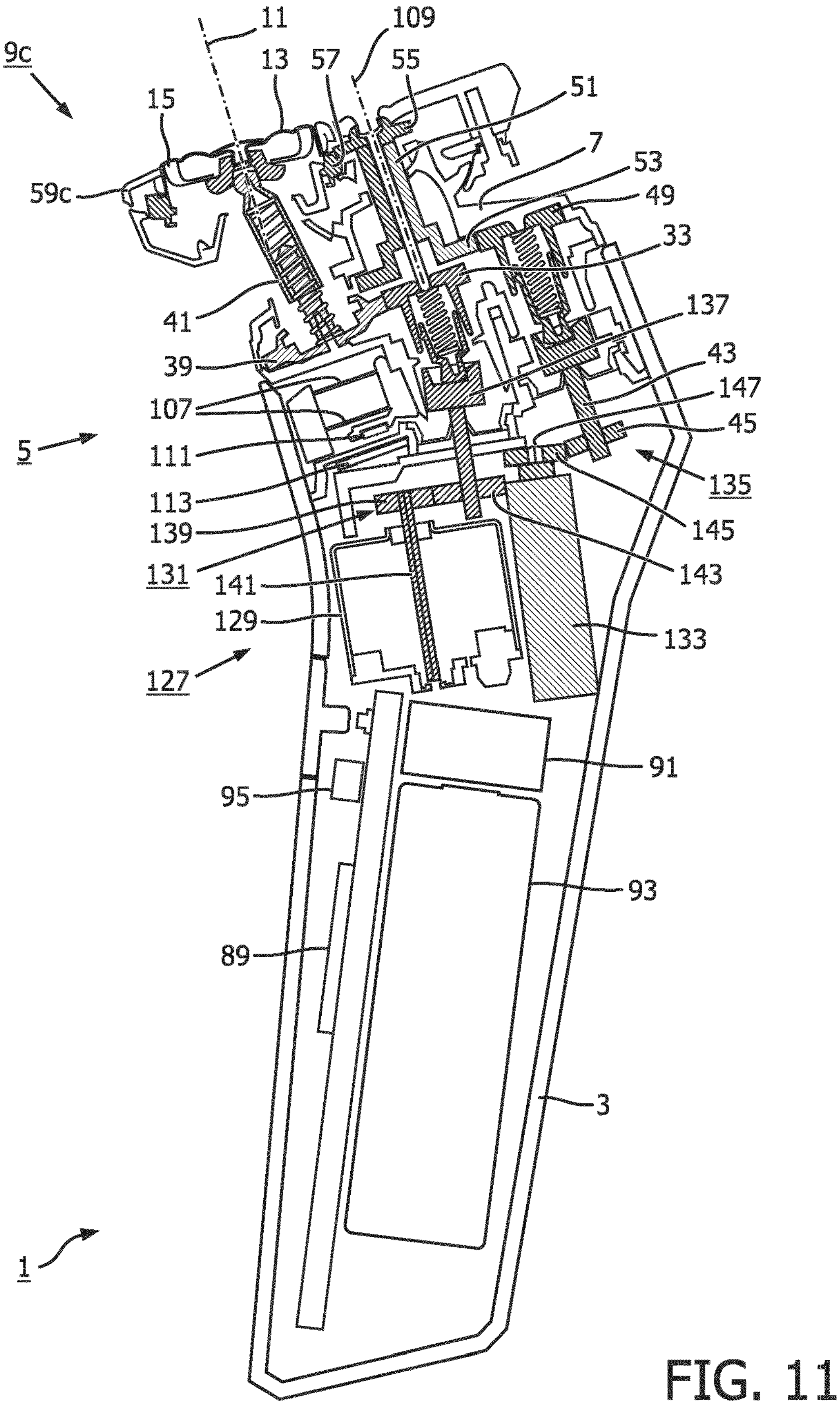
FIG. 11 schematically shows an alternative embodiment of the drive system of the electric shaver of FIG. 1.

As discussed here before, in the embodiment shown in FIG. 3 the drive system 27 of the electric shaver 1 comprises a single motor 29 and a transmission system 31 via which the motor 29 is able to rotate both the internal cutting member 15 and the external cutting member 13 of each hair-cutting unit 9*a*, 9*b*, 9*c*. The use of the single motor 29 in this embodiment results in a relatively simple structure of the electric shaver 1. In this embodiment. an adjustment of the second rotational speed ω2 of the external cutting members 13 by the processor 89 will also result in a proportional adjustment of the first rotational speed ω1 of the internal cutting members 15. Such an adjustment of the first rotational speed ω1 may be acceptable in many practical applications as long as the first rotational speed ω1 remains within a range required for effective hair cutting by the rotating internal cutting members 15. FIG. 11 schematically shows an alternative embodiment of a drive system 127 of the electric shaver 1 according to the invention, which allows the second rotational speed ω2 of the external cutting members 13 to be adjusted independently from the first rotational speed ω1 of the internal cutting members 15. Parts of the alternative embodiment of the drive system 127 and the electric shaver 1 shown in FIG. 11, that correspond with parts of the embodiment of the drive system 27 and the electric shaver 1 shown in FIG. 3, are indicated by corresponding reference numbers in FIG. 11.

As shown in FIG. 11, in said alternative embodiment the drive system 127 comprises a first motor 129 configured and arranged to rotate, via a first transmission system 131, the internal cutting member 15 of each hair-cutting unit 9*a*, 9*b*, 9*c* about the central axis 11 of the hair-cutting unit 9*a*, 9*b*, 9*c*, and a second motor 133 configured and arranged to rotate, via a second transmission system 135, the external cutting member 13 of each hair-cutting unit 9*a*, 9*b*, 9*c* about the central axis 11 of the hair-cutting unit 9*a*, 9*b*, 9*c*. The first transmission system 131 comprises a primary shaft 137 which carries the first primary gear wheel 33 mentioned here before with reference to the drive system 27 shown in FIG. 3. The primary shaft 137 is rotatably journaled relative to the main housing 3 and the supporting structure 7 of the shaving unit 5, and is arranged to be driven by the first motor 129 via an intermediate gear wheel 139 mounted to a motor shaft 141 of the first motor 129 and an intermediate gear wheel 143 mounted to the primary shaft 137. The first primary gear wheel 33 is coupled to each of the three internal cutting members 15 via the three secondary gear wheels 39 and the three drive spindles 41 mentioned here before with reference to the drive system 27 shown in FIG. 3. The second transmission system 135 comprises a second primary gear wheel 145 mounted to a motor shaft 147 of the second motor 133. The second primary gear wheel 145 engages the third primary gear wheel 45 mentioned here before with reference to the drive system 27 shown in FIG. 3. Thus, the second primary gear wheel 145 is coupled to each of the three external cutting members 13 via the third primary gear wheel 45, the secondary shaft 43, the fourth primary gear wheel 49, the fifth primary gear wheel 53, the third shaft 51, the sixth primary gear wheel 55, and the three secondary gear wheels 57 mentioned here before with reference to the drive system 27 shown in FIG. 3.

When the electric shaver 1 comprises the alternative embodiment of the drive system 127, the processor 89 is configured and arranged to control the second motor 133 of the drive system 127 such that the second rotational speed ω2 of the external cutting members 13 depends on the measured user-related parameter, for example in accordance with the examples as discussed here before with reference to the FIGS. 10*a*-10*f*. In particular, the processor 89 may control the second rotational speed ω2 independently from the first rotational speed ω1 of the internal cutting members 15. For example, the processor 89 may control the first motor 129 such as to maintain the first rotational speed ω1 at a constant value which is optimal for hair cutting by the rotating internal cutting members 15, and the processor 89 may control the second motor 133 such as to adjust the second rotational speed ω2 to maintain the hair-catching efficiency of the external cutting members 13 at an optimum level when the measured user-related parameter changes. For this purpose, as will be clear for the person skilled in the art, the power-control module 91 may be configured to independently power the first motor 129 and the second motor 133 based on, respectively, a first output signal of the processor 89 related to the first rotational speed ω1 to be realized by the first motor 129 and a second output signal of the processor 89 related to the second rotational speed ω2 to be realized by the second motor 133. The independent control of the rotation of the external cutting members 13 in this alternative embodiment of the drive system 127 further allows, for example, the provision of a user input member by means of which the user can switch on or off the rotation of the external cutting members 13 or select between a number of predefined ranges for the second rotational speed ω2 based on user preference.

It will be clear to a person skilled in the art that the scope of the invention is not limited to the examples discussed in the foregoing, and that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details which are not required for understanding the invention may have been omitted, and may not necessarily be to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The invention claimed is:

1. Electric shaver comprising:

at least one hair-cutting unit having a central axis, an external cutting member having hair-entry openings provided in an annular shaving area arranged concentrically about the central axis, and an internal cutting member covered by the external cutting member and having an annular array of cutting elements arranged concentrically about the central axis; and a drive system configured to rotate the internal cutting member of each hair-cutting unit about the central axis of the hair-cutting unit at a first rotational speed, and to rotate the external cutting member of each hair-cutting unit about the central axis of the hair-cutting unit at a second rotational speed and such that the internal cutting member and the external cutting member of each hair-cutting unit are rotated relative to each other about the central axis of the hair-cutting unit;

wherein the electric shaver further comprises:

a detection system configured and arranged to measure at least one user-related parameter relating to skin or hairs of a user of the electric shaver or relating to manipulation of the electric shaver by the user relative to a body of the user; and a processor configured and arranged to control the drive system such that the second rotational speed, at which the drive system rotates the external cutting member about the central axis of the hair-cutting unit, depends on the at least one measured user-related parameter.

2. Electric shaver as claimed in claim 1, wherein the at least one user-related parameter comprises at least one of:

a location of the electric shaver on a body of the user;

a cumulative amount of shaving time of the electric shaver for a plurality of different areas of the user's body during a shaving session;

a motion speed at which the user moves the electric shaver over the user's body;

a pressure or force at which the user presses the electric shaver against the body;

a parameter relating to a skin property of the user; and a parameter relating to a hair property of the user.

3. Electric shaver as claimed in claim 2, wherein:

the at least one user-related parameter comprises the location of the electric shaver on the body of the user, and the detection system comprises a detector configured and arranged to measure the location of the electric shaver on the body of the user.

4. Electric shaver as claimed in claim 2, wherein:

the at least one user-related parameter comprises the cumulative amount of shaving time of the electric shaver for a plurality of different areas of the user's body during a shaving session;

the detection system comprises a detector configured and arranged to measure the location of the electric shaver on the body of the user; and the processor is configured to measure the cumulative amount of shaving time of the electric shaver for each of the plurality of different areas of the user's body based on the location of the electric shaver measured by the detector and timing output provided by a timer.

5. Electric shaver as claimed in claim 2, wherein:

the at least one user-related parameter comprises the motion speed at which the user moves the electric shaver over the user's body; and the detection system comprises a detector configured and arranged to measure the motion speed at which the user moves the electric shaver over the user's body.

6. Electric shaver as claimed in claim 2, wherein:

the at least one user-related parameter comprises the pressure or force at which the user presses the electric shaver against the body; and the detection system comprises a detector configured and arranged to measure the pressure or force at which the user presses the electric shaver against the body.

7. Electric shaver as claimed in claim 2, wherein:

the at least one user-related parameter comprises the parameter relating to the skin property of the user; and the detection system comprises a detector configured and arranged to measure said parameter relating to said skin property of the user.

8. Electric shaver as claimed in claim 2, wherein:

the at least one user-related parameter comprises the parameter relating to the hair property of the user; and the detection system comprises a detector configured and arranged to measure said parameter relating to said hair property of the user.

9. Electric shaver as claimed in claim 1, wherein the drive system comprises a single motor configured and arranged to rotate both the internal cutting member of each hair-cutting unit and the external cutting member of each hair-cutting unit about the central axis of the hair-cutting unit via a transmission system, and wherein the processor is configured and arranged to control the single motor such that the second rotational speed of the external cutting member depends on the measured user-related parameter.

10. Electric shaver as claimed in claim 1, wherein the drive system comprises a first motor configured and arranged to rotate the internal cutting member of each hair-cutting unit about the central axis of the hair-cutting unit, and a second motor configured and arranged to rotate the external cutting member of each hair-cutting unit about the central axis of the hair-cutting unit, and wherein the processor is configured and arranged to control the second motor such that the second rotational speed of the external cutting member depends on the measured user-related parameter.

11. Electric shaver as claimed in claim 1, wherein the drive system is configured to rotate the internal cutting member of each hair-cutting unit in a first rotational direction about the central axis of the hair-cutting unit and to rotate the external cutting member of each hair-cutting unit in a second rotational direction opposite to the first rotational direction about the central axis of the hair-cutting unit, and wherein the second rotational speed of the external cutting member is lower than the first rotational speed of the internal cutting member.

12. Electric shaver as claimed in claim 11, wherein the hair-entry openings of the external cutting member of each hair-cutting unit comprise a V-shaped opening portion pointing in the first rotational direction of the internal cutting member, and the second rotational speed of the external cutting member of each hair-cutting unit is such that a tangential speed of the external cutting member relative to the central axis, measured in a radial position of a central base point of the V-shaped opening portions relative to the central axis, is in a range between 7.5 and 50 cm/s, more preferably in a range between 11.25 and 30.0 cm/s.

13. Electric shaver as claimed in claim 12, wherein the hair-entry openings extend over a first radial distance in a radial direction relative to the central axis of the hair-cutting unit, and the V-shaped opening portions of the hair-entry openings extend over a second radial distance in the radial direction, said second radial distance being at least 50% of said first radial distance.

14. Electric shaver as claimed in claim 12, wherein the hair-entry openings of the external cutting member of each hair-cutting unit further comprise a radially inner straight opening portion, connected to the V-shaped opening portion at a first end of the V-shaped opening portion facing the central axis of the hair-cutting unit, and a radially outer straight opening portion, connected to the V-shaped opening portion at a second end of the V-shaped opening portion facing away from the central axis of the hair-cutting unit, said radially inner and outer straight opening portions each having a main direction of extension in a radial direction relative to the central axis of the hair-cutting unit.

15. Electric shaver as claimed in claim 12, wherein a V-angle of the V-shaped opening portions of the hair-entry openings is in a range from 60° to 135°.

* * * * *